(12) United States Patent
Noro

(10) Patent No.: US 11,477,101 B2
(45) Date of Patent: Oct. 18, 2022

(54) COMMUNICATION TIME CALCULATION METHOD AND RECORDING MEDIUM RECORDING COMMUNICATION TIME CALCULATION PROGRAM

(71) Applicant: FUJITSU LIMITED, Kawasaki (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 17/100,588

(22) Filed: Nov. 20, 2020

(65) Prior Publication Data

US 2021/0226874 A1 Jul. 22, 2021

(30) Foreign Application Priority Data

Jan. 21, 2020 (JP) .............................. JP2020-007721

(51) Int. Cl.
*H04L 43/0852* (2022.01)
*H04L 69/22* (2022.01)

(52) U.S. Cl.
CPC .......... *H04L 43/0852* (2013.01); *H04L 69/22* (2013.01)

(58) Field of Classification Search
CPC ................... H04L 69/22; H04L 47/283; H04L 43/0852–087; H04L 67/325
See application file for complete search history.

(56) References Cited

U.S. PATENT DOCUMENTS

| 6,769,029 | B1 * | 7/2004 | Seki ..................... H04L 43/0852 370/473 |
| 2006/0104198 | A1 * | 5/2006 | Takano ................. G01S 13/765 370/210 |

(Continued)

FOREIGN PATENT DOCUMENTS

| JP | 2001-053792 A | 2/2001 |
| JP | 2001-244932 A | 9/2001 |

OTHER PUBLICATIONS

Mills, D. L., "Network Time Protocol (NTP)", M/A-COM Linkabit, RFC 958, Internet Engineering Task Force, IETF; Standard, Internet Society (ISOC) 4, pp. 1-15, Sep. 1, 1985, XP15006954.

(Continued)

*Primary Examiner* — John A Follansbee
*Assistant Examiner* — Fadi Haj Said
(74) *Attorney, Agent, or Firm* — Fujitsu Patent Center

(57) ABSTRACT

A method for calculating a communication time between a first and second devices includes: adding, to a first packet, first timer information indicating an elapsed time from activation of the first device, and transmitting the first packet; transmitting notification information including the first timer information and second timer information indicating an elapsed time from activation of the second device; transmitting a second packet including the first and second timer information, third timer information indicating an elapsed time from activation of the second device, and first time information indicating a time in the second device; and calculating a communication time from the first device to the second device based on the first timer information, the second timer information, the third timer information, and the first time information, fourth timer information indicating an elapsed time from activation of the first device, and second time information indicating a time in the first device.

10 Claims, 25 Drawing Sheets

(56) References Cited

U.S. PATENT DOCUMENTS

2009/0310726 A1\* 12/2009 Alankry ............... H04J 3/0697
                                                      375/359
2016/0026490 A1\*  1/2016 Johnsson ............... H04L 43/20
                                                      718/1
2020/0228565 A1\*  7/2020 Reverte ................. H04L 43/16

OTHER PUBLICATIONS

Shalunov, S. et al., "A One-way Active Measurement Protocol (OWAMP)", Network Working Group, Request for Comments: 4656, Category: Standards Track, Internet Engineering Task Force, IETF; Standard, Internet Society (ISOC) 4, pp. 1-56, Sep. 1, 2006, XP15047408.

Hedayat, K. et al., "A Two-Way Active Measurement Protocol (TWAMP)", Network Working Group, Request for Comments: 5357, Category: Standards Track, pp. 1-26, Oct. 1, 2008, XP55161710.

Extended European Search Report dated Apr. 29, 2021 for corresponding European Patent Application No. 20206926.6, 11 pages.

\* cited by examiner

FIG. 22

| NUMBER | TRANSMISSION DELAY TIME |
|---|---|
| 1 | D1_1 |
| ⋮ | ⋮ |
| n | D1_n |

2200

COMMUNICATION TIME CALCULATION METHOD AND RECORDING MEDIUM RECORDING COMMUNICATION TIME CALCULATION PROGRAM

CROSS-REFERENCE TO RELATED APPLICATION

This application is based upon and claims the benefit of priority of the prior Japanese Patent Application No. 2020-7721, filed on Jan. 21, 2020, the entire contents of which are incorporated herein by reference.

FIELD

The embodiments discussed herein are related to a communication time calculation method and a communication time calculation program.

BACKGROUND

In recent years, various services have been developed in cloud, and information collection for diagnosing soundness of cloud systems has become important. Information used for diagnosing a cloud system includes, for example, a transmission delay time that is a time needed for transmitting a user packet in a container environment.

Japanese Laid-open Patent Publication No. 2001-53792 and Japanese Laid-open Patent Publication No. 2001-244932 are disclosed as related art.

SUMMARY

According to an aspect of the embodiments, a method for calculating a communication time between a first device and a second device includes: by the first device, adding, to a first packet, first timer information indicating an elapsed time from activation of the first device at a time of transmission of the first packet to the second device, and transmitting the first packet; by a communication module of the second device, transmitting notification information including the first timer information included in the received first packet and second timer information indicating an elapsed time from activation of the second device at a time of reception of the first packet to a relay module of the second device; by the relay module of the second device, transmitting a second packet including the first timer information and the second timer information included in the received notification information, third timer information indicating an elapsed time from activation of the second device at a time of reception of the notification information, and first time information indicating a time in the second device at the time of reception of the notification information to the first device; and by the first device, calculating a communication time from the first device to the second device on the basis of the first timer information, the second timer information, the third timer information, and the first time information included in the received second packet, fourth timer information indicating an elapsed time from activation of the first device at a time of reception of the second packet, and second time information indicating a time in the first device at the time of reception of the second packet.

The object and advantages of the invention will be realized and attained by means of the elements and combinations particularly pointed out in the claims.

It is to be understood that both the foregoing general description and the following detailed description are exemplary and explanatory and are not restrictive of the invention.

According to one aspect of the embodiments, an effect of measuring a time needed for communication between devices without adding a special mechanism to an application that performs the communication to be measured is exhibited.

BRIEF DESCRIPTION OF DRAWINGS

FIG. 22 is an explanatory diagram illustrating a specific example of a transmission delay list;

DESCRIPTION OF EMBODIMENTS

For example, there is an analyzation to analyze an input time input to a packet network and an output time output from the packet network, which are detected for each packet by a packet measurement terminal connected to a network segment as a gateway to the packet network as viewed from a communication terminal, and measure the transmission delay time of the packet network. Furthermore, there is a technology for measuring the transmission delay time with high measurement precision in millisecond units by causing devices to be time-synchronized with high precision under a distributed computer network environment or the like.

However, the time needed for communication between devices may not be measured if an application that performs the communication to be measured does not have a measurement function.

In one aspect, a time needed for communication between devices may be measured without adding a special mechanism to an application that performs the communication to be measured.

Hereinafter, embodiments of a communication time calculating method and a communication time calculating program according to the present embodiments will be described in detail with reference to the drawings.

First Embodiment

First, a system configuration example of an information processing system 100 according to a first embodiment will be described. The information processing system 100 is applied to, for example, a computer system that provides a cloud service for lending an application execution environment to a user.

Figure 1:
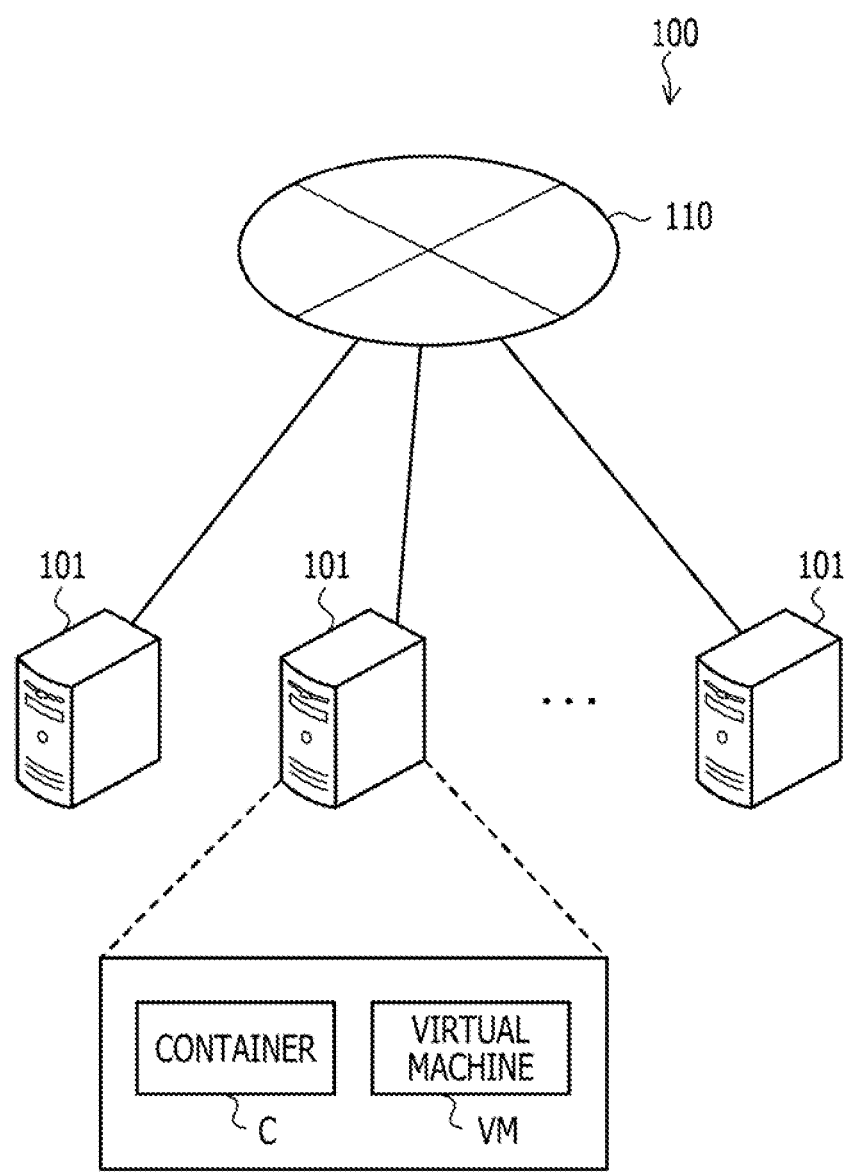
FIG. 1 is an explanatory diagram illustrating a system configuration example of an information processing system 100 according to a first embodiment.

FIG. 1 is an explanatory diagram illustrating a system configuration example of the information processing system 100 according to the first embodiment. In FIG. 1, the information processing system 100 includes a plurality of information processing devices 101. In the information processing system 100, the plurality of information processing devices 101 is connected via a wired or wireless network 110. The network 110 is, for example, the Internet, a LAN, a wide area network (WAN), or the like.

Here, the information processing device 101 is a computer capable of executing a container C. The container C (container) corresponds to a user space that is created by internally dividing kernel of an operating system (OS) and is isolated from the others, and operates as one of OS processes. The kernel is a part that plays a core role of the OS and is software that executes basic functions of the OS. The user space is an execution environment in which resources for the user to execute an application are grouped together.

The resources of the OS are logically divided and shared by a plurality of containers C. Specifically, for example, an internet protocol (IP) address or a host name is allocated to each container C. Furthermore, resources such as a central processing unit (CPU), a memory, and a disk are also logically separated for each container C.

The container C is implemented by, for example, a namespace function and a cgroups (controlgroups) function of the OS kernel. The namespace function is a function to group processes to isolate a group from the other groups. The cgroups function is a function to control allocation of the resources to the grouped processes.

Furthermore, the information processing device 101 may be able to execute a virtual machine VM. The virtual machine VM is a virtual computer that operates in an execution environment constructed by dividing hardware resources of a physical computer. The virtual machine VM is implemented by, for example, virtualizing the hardware resources with a hypervisor.

Here, as one of pieces of information for diagnosing the soundness of a cloud system, there is a transmission delay (communication time) that is a time needed for transmitting a packet exchanged between the containers C. As a technique for measuring the transmission delay, use of a timestamp option header of request for comments (RFC) 791 is conceivable, for example. The timestamp option header is an option header of IPv4 for acquiring a propagation delay time of a packet (transmission control protocol (TCP)/IP standard).

For example, it is conceivable that an application on a sending side adds an option header to a packet, a device that relays the packet writes its own IP address and time in the option header, and an application on a receiving side analyzes the option header and measures the communication time. The time is, for example, an elapsed time (in millisecond units) from universal time coordinated (UTC) 0 o'clock on the day.

However, this technology may not be applied when the applications on the sending and receiving sides do not have the function to read and write an option header and the function to measure the communication time like a user application operating on the container C. Furthermore, the transmission delay of the packet exchanged between the containers C may be less than 1 millisecond.

Furthermore, it is conceivable to mirror and accumulate packets exchanged between devices at a gateway to a network and to analyze the accumulated mirror packets to measure the transmission delay. However, there is a problem that the accumulated amount of mirror packets becomes enormous and the time and load needed for analyzing the accumulated mirror packets increase.

Furthermore, it is conceivable to measure the transmission delay by causing devices to be time-synchronized with high precision. In the case of applying this technique to measurement of the transmission delay of the packet exchanged between the containers C, a device (module) that processes and reads the packet needs to be built in the OS kernel and time-synchronized.

Here, clocks of an UNIX-type OS (UNIX is a registered trademark) include a clock indicating a calendar time and a clock indicating a timer value. Time and time zone can be set as the calendar time. The calendar time can be synchronized between the devices. However, the module in the OS kernel does not read the calendar time.

Meanwhile, the module in the OS kernel can read the timer value. The timer value indicates an elapsed time from activation of the device (OS). However, the timer value is a value that continues to be counted up in a clock cycle from the time of booting the OS and is not settable even by an administrator with authority, so devices are not able to be synchronized.

Therefore, in the present embodiment, a communication time calculation method for calculating the transmission delay (communication time) of a packet exchanged between devices even in an environment where only the timer value can be acquired by the module that processes and reads the packet will be described.

First, a module example in the information processing system 100 will be described with reference to FIG. 2. Here, among the plurality of information processing devices 101, one information processing device 101 of the information processing devices 101 communicating with each other via the network 110 is referred to as "information processing device 101 #", and the other information processing device 101 is referred to as "information processing device 101$".

Figure 2:
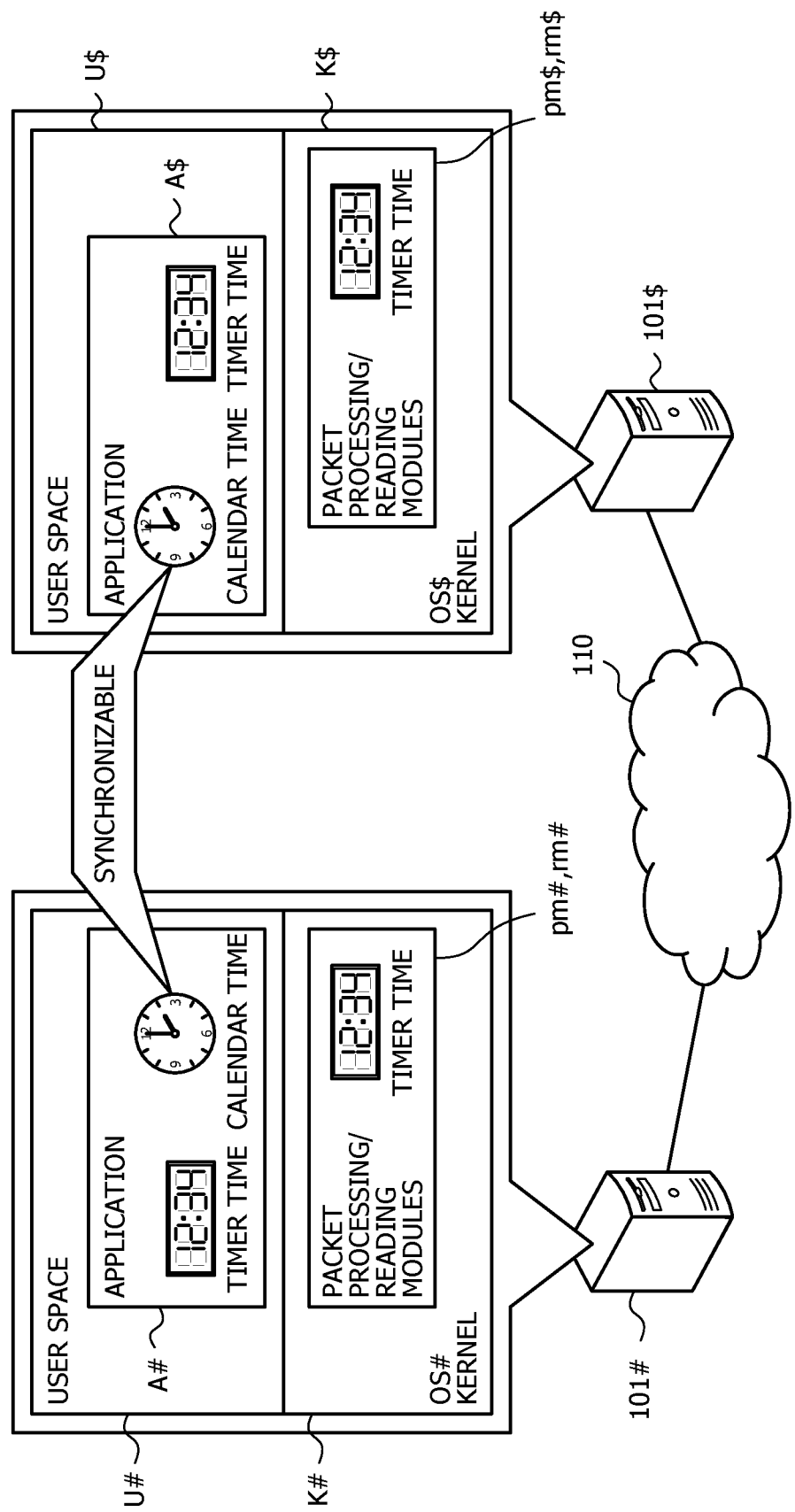
FIG. 2 is an explanatory diagram illustrating a module example in an information processing device 101 according to the first embodiment.

FIG. 2 is an explanatory diagram illustrating a module example in the information processing device 101 according to the first embodiment. FIG. 2 illustrates the information processing device 101 # and the information processing device 101$. In the information processing device 101 #, a packet processing module pm # and a packet reading module rm # are provided in kernel K # of an OS #. Furthermore, an application A # is executed in a user space U #.

In the information processing device 101$, a packet processing module pm$ and a packet reading module rm$ are provided in kernel K$ of an OS$. Furthermore, an application A$ is executed in a user space U$. The packet processing modules pm # and pm$ have a function to process a packet. The packet reading modules rm # and rm$ have a function to read a packet.

The packet processing modules pm # and pm$ and the packet reading modules rm # and rm$ are implemented by, for example, a program (so-called small VM). The applications A # and A$ are applications used to measure the communication time between the information processing devices 101 # and 101$.

The applications A # and A$ can read the calendar time and the timer time (corresponding to the above-described timer value). The calendar time can be synchronized between the applications A # and A$. The packet processing modules pm # and pm$ and the packet reading modules rm # and rm$ can read the timer time.

Note that any existing technology may be used for synchronization processing for the calendar times between the applications A # and A$. For example, the application A # may regard half of a round-trip time (RTT) of a path as one-way transmission time and set its own time from the time of the communication partner (application A$) and the transmission time. The RTT is a time needed to get a response from when a signal or data is sent to the communication partner.

Here, the communication time between the information processing devices 101 # and 101$ is calculated by linking the applications A # and A$ in the user spaces U # and U$ and each of the modules pm #, pm$, rm #, and rm$ in the kernel K # and K$, and combing the two types of clocks (the calendar time and the timer time).

Next, an operation example of the information processing system 100 will be described with reference to FIG. 3. Here, a case of measuring the transmission delay of a packet P transmitted from the information processing device 101 # to the information processing device 101$ will be described as an example. Furthermore, the application A # is referred to as "measurement application MA #", and the application A$ is referred to as "relay application RA$".

Figure 3:
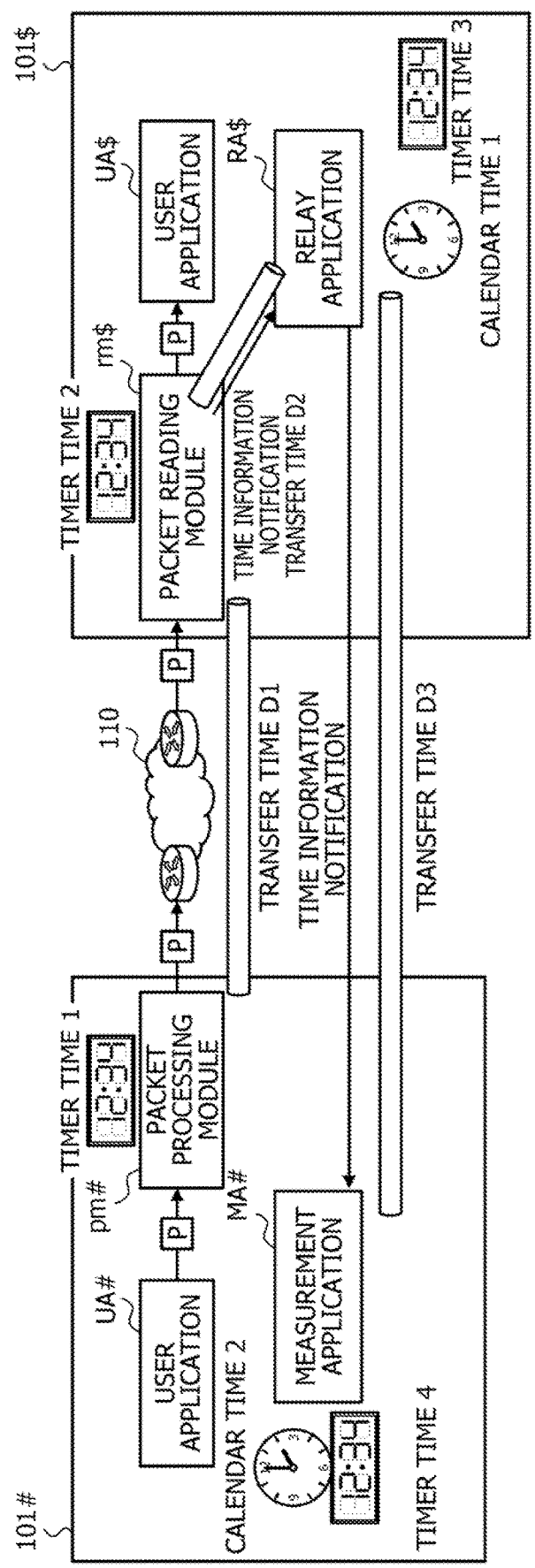
FIG. 3 is an explanatory diagram illustrating an example of a method for calculating a communication time according to the first embodiment.

FIG. 3 is an explanatory diagram illustrating an example of the communication time calculation method according to the first embodiment. In FIG. 3, a case in which the packet P is transmitted from a user application UA # of the information processing device 101 # to a user application UA$ of the information processing device 101$ is assumed.

In this case, in the information processing device 101 #, the packet processing module pm # adds a timer time 1 to the packet P and transmits the packet P. Here, the timer time 1 is timer information indicating an elapsed time from activation of the information processing device 101 # at the time of transmission of the packet P to the information processing device 101$.

In the information processing device 101$, when receiving the packet P, the packet reading module rm$ transmits the timer time 1 included in the packet P and a timer time 2 to the relay application RA$. Here, the timer time 2 is timer information indicating an elapsed time from activation of the information processing device 101$, of when the packet reading module rm$ receives the packet P. Furthermore, the packet reading module rm$ transfers the received packet P to the user application UA$.

In information processing device 101$, when receiving the timer time 1 and the timer time 2, the relay application RA$ transmits the timer time 1, the timer time 2, a timer time 3, and a calendar time 1 to a measurement application MA # of the information processing device 101 #. Here, the timer time 3 is timer information indicating an elapsed time from activation of the information processing device 101$, of when the relay application RA$ receives the timer time 1 and the timer time 2. The calendar time 1 is time information indicating the time in the information processing device 101$, of when the relay application RA$ receives the timer time 1 and the timer time 2.

In the information processing device 101 #, when receiving the timer time 1, the timer time 2, the timer time 3, and the calendar time 1, the measurement application MA # calculates the communication time from the information processing device 101 # to the information processing device 101$ on the basis of the timer time 1, the timer time 2, the timer time 3, a timer time 4, the calendar time 1, and a calendar time 2.

Here, the timer time 4 is timer information indicating an elapsed time from activation of the information processing device 101 #, of when the measurement application MA # receives the timer time 1, the timer time 2, the timer time 3, and the calendar time 1. The calendar time 2 is time information indicating the time in the information processing device 101 #, of when the measurement application MA # receives the timer time 1, the timer time 2, the timer time 3, and the calendar time 1.

Furthermore, the communication time from the information processing device 101 # to the information processing device 101$ is a transfer time D1 from when the packet processing module pm # transmits the packet P to when the packet reading module rm$ receives the packet P.

Specifically, for example, the measurement application MA # calculates RTT (total time) from the timer time 1 and the timer time 4. The RTT (total time) is a time from when the packet processing module pm # transmits the packet P to when the measurement application MA # receives the timer time 1, the timer time 2, the timer time 3, and the calendar time 1.

Furthermore, the measurement application MA # calculates a transfer time D2 from the timer time 2 and the timer time 3. The transfer time D2 is a time from when the packet reading module rm$ transmits the timer time 1 and the timer time 2 to when the relay application RA$ receives the timer time 1 and the timer time 2.

Furthermore, the measurement application MA # calculates a transfer time D3 from the calendar time 1 and the calendar time 2. The transfer time D3 is a time from when the relay application RA$ transmits the timer time 1, the timer time 2, the timer time 3, and the calendar time 1 to when the measurement application MA # receives the timer time 1, the timer time 2, the timer time 3, and the calendar time 1.

Then, the measurement application MA # calculates the transfer time D1 by subtracting the calculated transfer time D2 and transfer time D3 from the calculated RTT (total time). Hereinafter, a specific processing example of each module in the information processing devices 101 # and 101$ will be described with reference to FIGS. 4 to 7.

Figure 4:
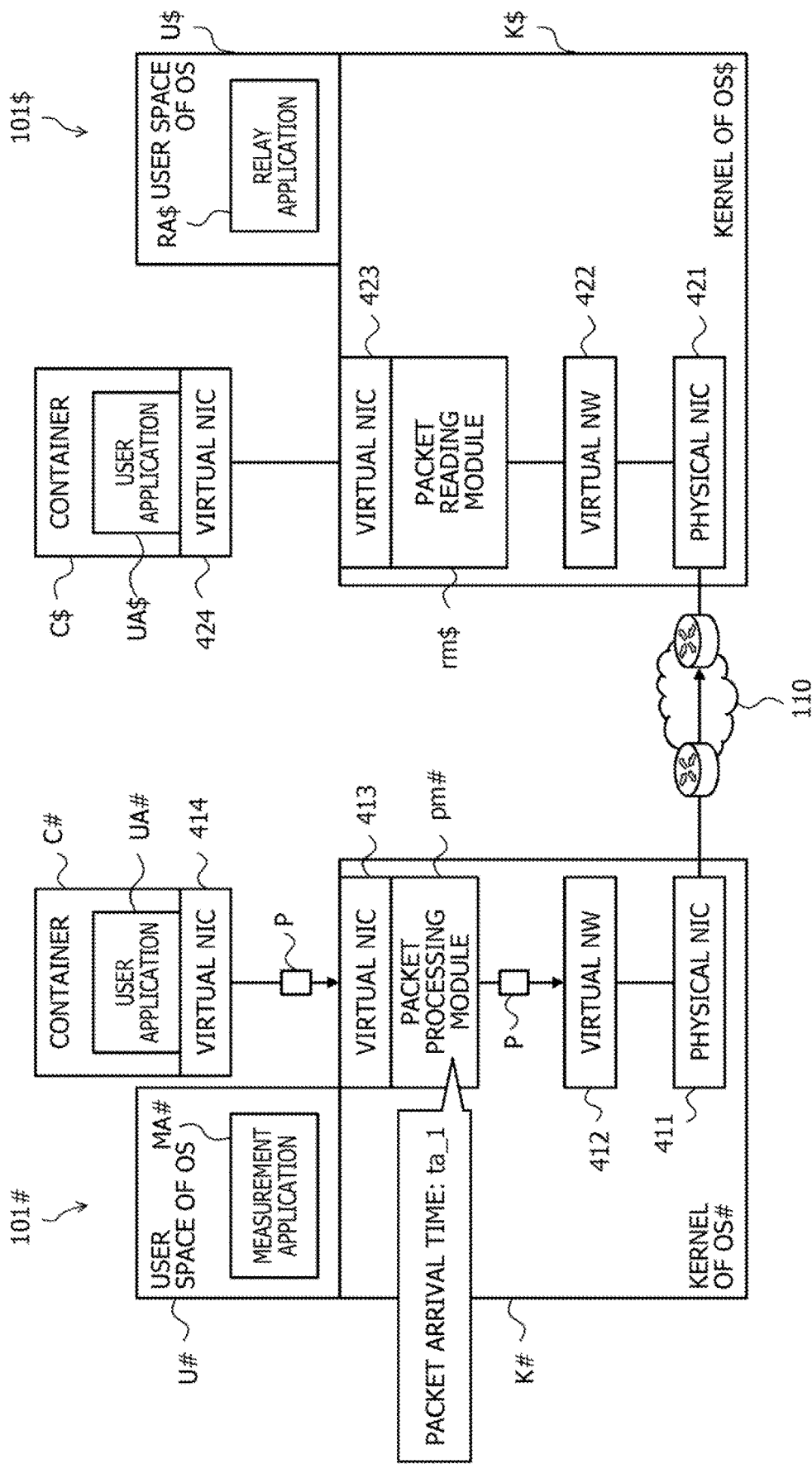
FIG. 4 is an explanatory diagram (No. 1) illustrating an operation example of the information processing system 100.

FIGS. 4 to 7 are explanatory diagrams illustrating an operation example of the information processing system 100. In FIG. 4, a container C # is executed on the OS # of the information processing device 101 #. The OS # includes a physical network interface card (NIC) 411, a virtual NW 412, and a virtual NIC 413.

Furthermore, a container C$ is executed on the OS$ of the information processing device 101$. The OS$ includes a physical NIC 421, a virtual NW 422, and a virtual NIC 423. The physical NICs 411 and 421 are devices for being connected to the network 110. The virtual NWs 412 and 422 are virtual networks inside the information processing devices 101 # and 101$ and are constructed by, for example, virtual switches, virtual NICs, virtual bridges, and the like.

The virtual NICs 413 and 423 are virtual NICs. The virtual NIC 413 is a virtual NIC for connection between the container C # and the OS # and is connected to face a virtual NIC 414 for the container C #. The virtual NIC 423 is a virtual NIC for connection between the container C$ and the OS$ and is connected to face a virtual NIC 424 for the container C$.

The measurement application MA # is executed in the user space U # of the information processing device 101 #. Furthermore, the relay application RA$ is executed in the user space U$ of the information processing device 101$. The packet processing module pm # is provided corresponding to the virtual NIC 413 in the kernel K # of the OS #. Furthermore, the packet reading module rm$ is provided corresponding to the virtual NIC 423 in the kernel K$ of the OS$.

Here, the packet P is a packet transmitted from the user application UA # to the user application UA$. The user application UA # is an application that operates on the container C # executed on the OS # of the information processing device 101 #. The user application UA$ is an application that operates on the container C$ executed on the OS$ of the information processing device 101$.

First, when receiving the packet P transmitted from the user application UA # via the virtual NIC 413, the packet processing module pm # acquires a packet arrival time ta_1. The packet arrival time ta_1 corresponds to the above-described timer time 1. Then, the packet processing module pm # adds the acquired packet arrival time ta_1 to the packet P and transfers the packet P.

Here, a data structure example of the packet P will be described with reference to FIG. 8.

Figure 8:
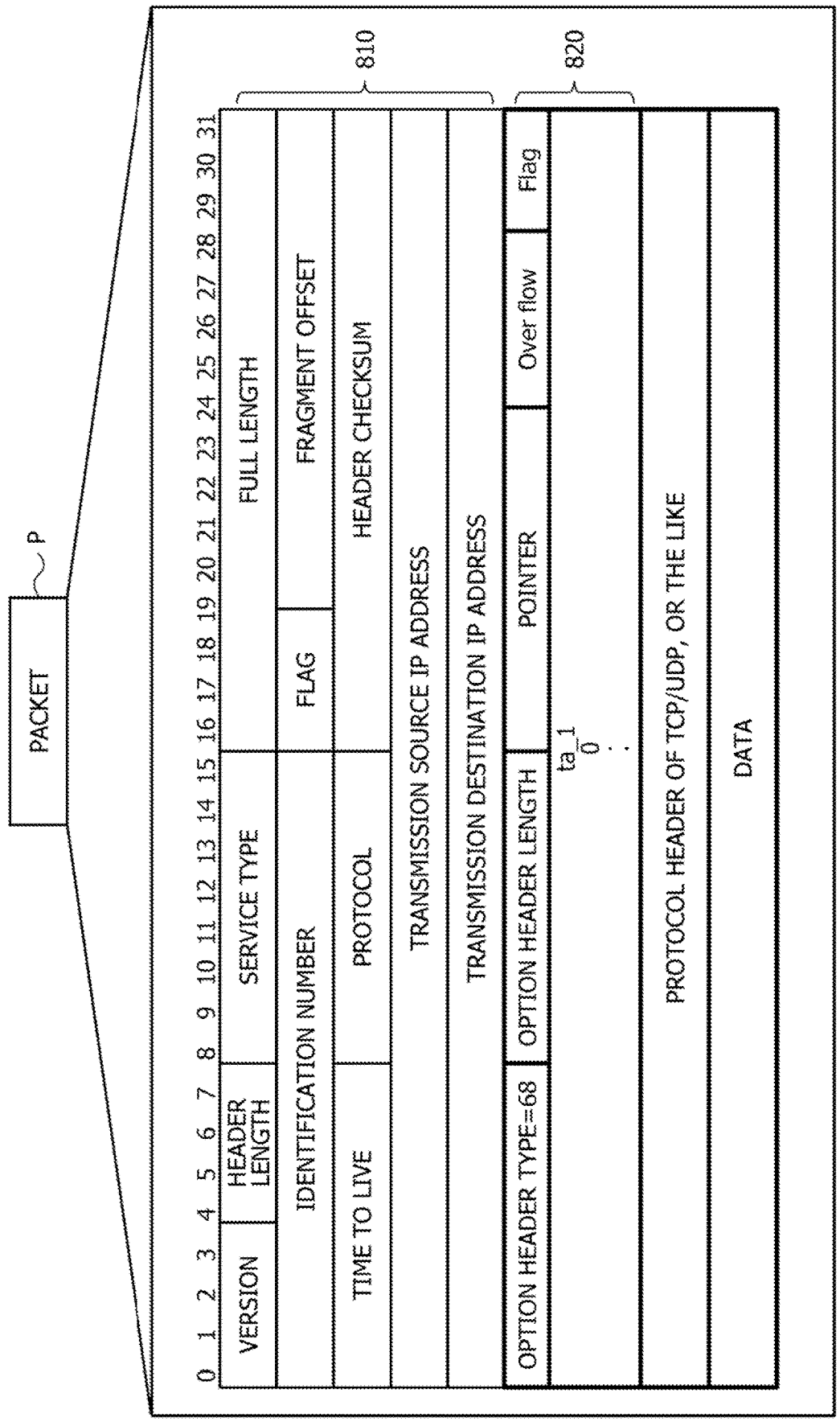
FIG. 8 is an explanatory diagram illustrating a data structure example of a packet P.

FIG. 8 is an explanatory diagram illustrating a data structure example of the packet P. In FIG. 8, the packet P includes an IP header 810 and a timestamp option header 820. The timestamp option header 820 is one of option headers of IPv4. An option header type "68" is a number indicating a timestamp option header.

Specifically, for example, when receiving the packet P, the packet processing module pm # writes the packet arrival time ta_1 in the timestamp option header 820 of the packet P and transfers the packet P. As a result, the packet P in which the packet arrival time ta_1 is written is sent to the network 110 and transmitted to the information processing device 101$.

Figure 5:
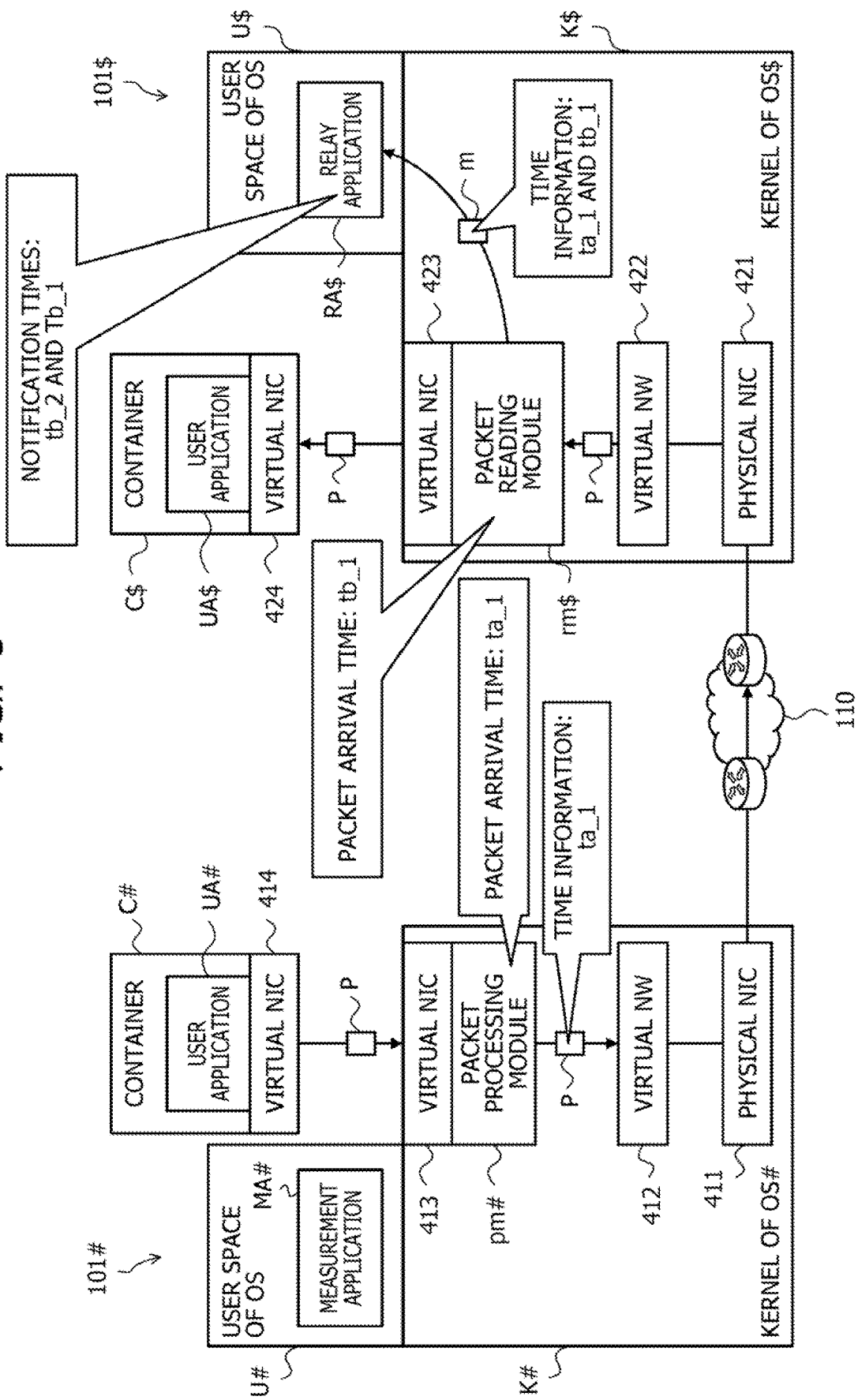
FIG. 5 is an explanatory diagram (No. 2) illustrating an operation example of the information processing system 100.

In FIG. 5, when receiving the packet P, the packet reading module rm$ acquires a packet arrival time tb_1. The packet arrival time tb_1 corresponds to the above-described timer time 2. Furthermore, the packet reading module rm$ reads the packet arrival time ta_1 from the timestamp option header 820 (see FIG. 8) of the received packet P.

Then, the packet reading module rm$ transmits a notification message m including the packet arrival time ta_1 and the packet arrival time tb_1 to the relay application RA$. Furthermore, the packet reading module rm$ transfers the received packet P to the user application UA$.

Note that the communication between the packet reading module rm$ and the relay application RA$ is message communication in the same OS$ and is thus not necessarily TCP/IP communication, and various communication methods can be used.

When receiving the notification message m, the relay application RA$ acquires a notification time tb_2 and a notification time Tb_1 from the OS$. The notification time tb_2 corresponds to the above-described timer time 3. The notification time Tb_1 corresponds to the above-described calendar time 1. Furthermore, the relay application RA$ reads the packet arrival time ta_1 and the packet arrival time tb_1 from the received notification message m.

Figure 6:
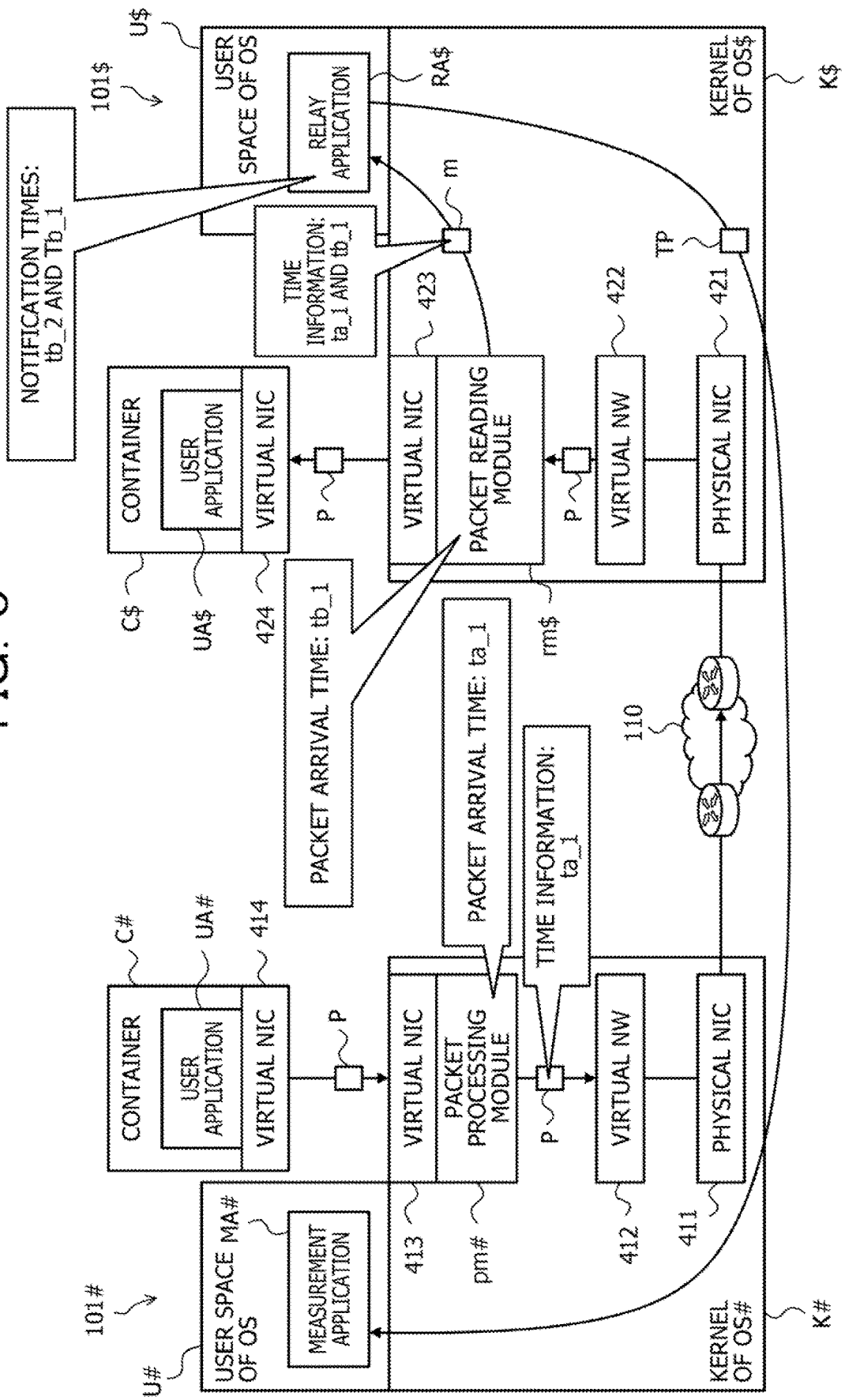
FIG. 6 is an explanatory diagram (No. 3) illustrating an operation example of the information processing system 100.

In FIG. 6, the relay application RA$ transmits a time information packet TP including the packet arrival time ta_1, the packet arrival time tb_1, the notification time tb_2, and the notification time Tb_1 to the measurement application MA # of the information processing device 101 #.

Here, a data structure example of the time information packet TP will be described with reference to FIG. 9.

Figure 9:
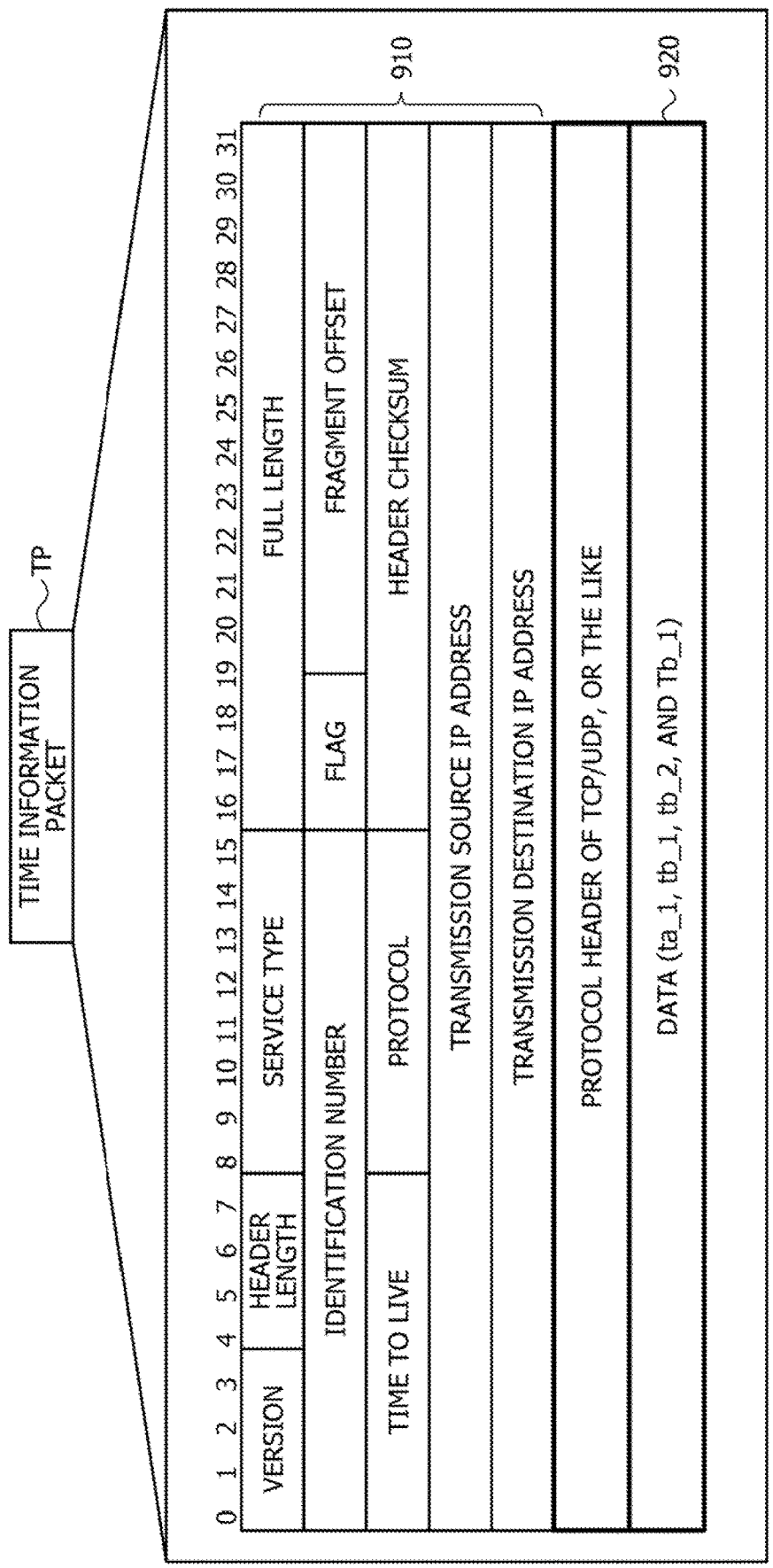
FIG. 9 is an explanatory diagram illustrating a data structure example of a time information packet TP.

FIG. 9 is an explanatory diagram illustrating a data structure example of the time information packet TP. In FIG. 9, the time information packet TP includes an IP header 910 and a payload 920. The various types of time information (ta_1, tb_1, tb_2, and Tb_1) are stored in the payload 920 of the time information packet TP.

Figure 7:
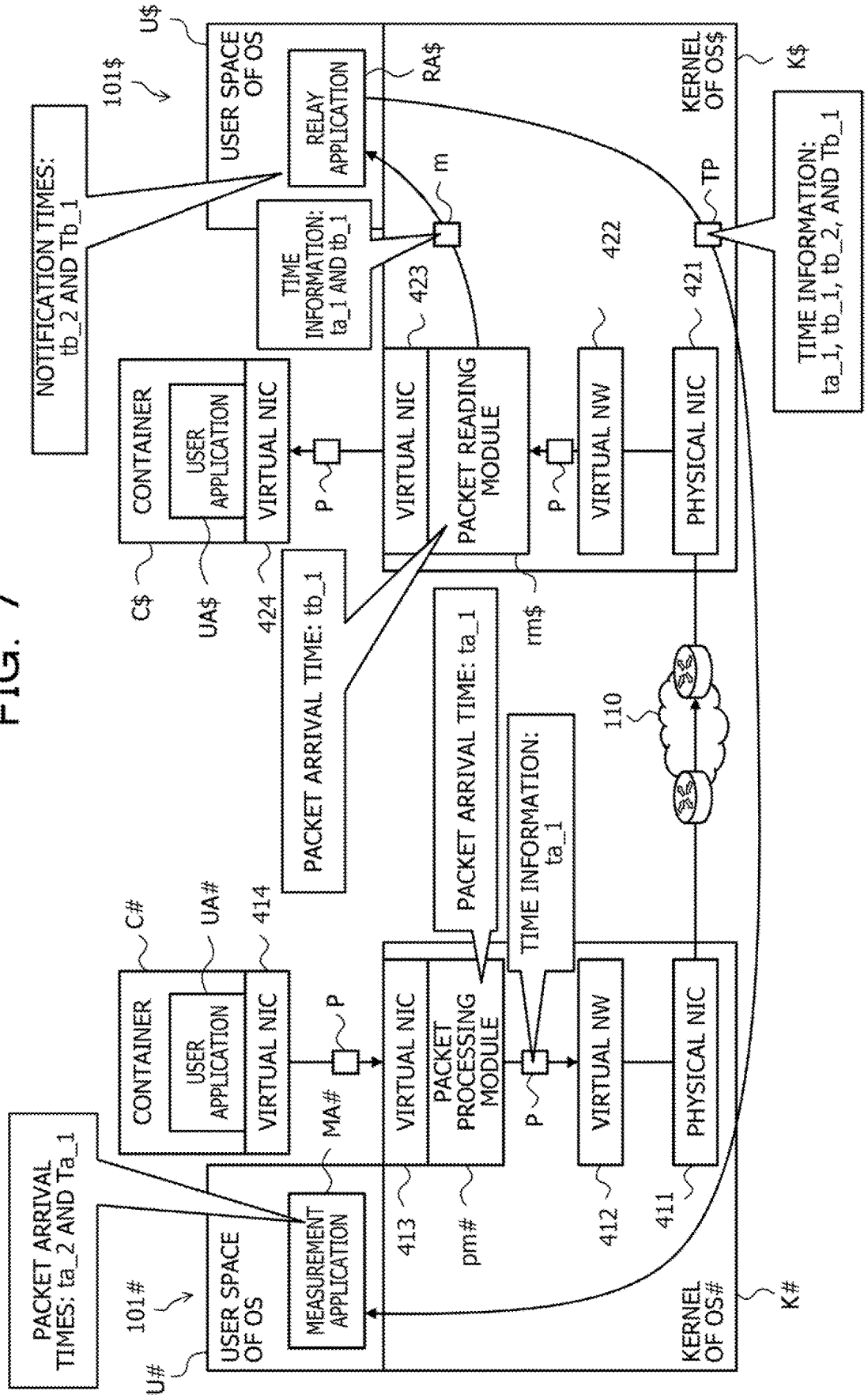
FIG. 7 is an explanatory diagram (No. 4) illustrating an operation example of the information processing system 100.

In FIG. 7, when receiving the time information packet TP, the measurement application MA # acquires a packet arrival time ta_2 and the packet arrival time Ta_1 from the OS #. The packet arrival time ta_2 corresponds to the above-described timer time 4. The packet arrival time Ta_1 corresponds to the above-described calendar time 2.

Furthermore, the measurement application MA # reads the packet arrival time ta_1, the packet arrival time tb_1, the notification time tb_2, and the notification time Tb_1 from the received time information packet TP. Then, the measurement application MA # calculates the communication time (transfer time D1) from the information processing device 101 # to the information processing device 101$ on the basis of the various types of time information (ta_1, ta_2, tb_1, tb_2, Tb_1, and Ta_1).

Specifically, for example, the measurement application MA # calculates the RTT by subtracting the packet arrival time ta_1 from the packet arrival time ta_2. The RTT corresponds to the time taken for all the processing from when the packet P is transmitted (that is, from when the packet processing module pm # receives the packet P) to when the measurement application MA # receives the time information packet TP.

Furthermore, the measurement application MA # calculates the transfer time D2 by subtracting the packet arrival time tb_1 from the notification time tb_2. The transfer time D2 corresponds to the time taken for the processing inside the OS$. Furthermore, the measurement application MA # calculates the transfer time D3 by subtracting the notification time Tb_1 from the packet arrival time Ta_1. The transfer time D3 corresponds to the time taken for transfer of the time information packet TP from the relay application RA$ to the measurement application MA #.

Then, the measurement application MA # calculates the transfer time D1 by subtracting the calculated transfer time D2 and transfer time D3 from the calculated RTT. Thereby, the transmission delay of the packet P can be measured without adding a special mechanism to the user applications UA # and UA$ even in the environment where each of the modules (pm # and rm$) that process and exchange the packet P can acquire only the timer information.

(Hardware Configuration Example of Information Processing Device 101)

Figure 10:
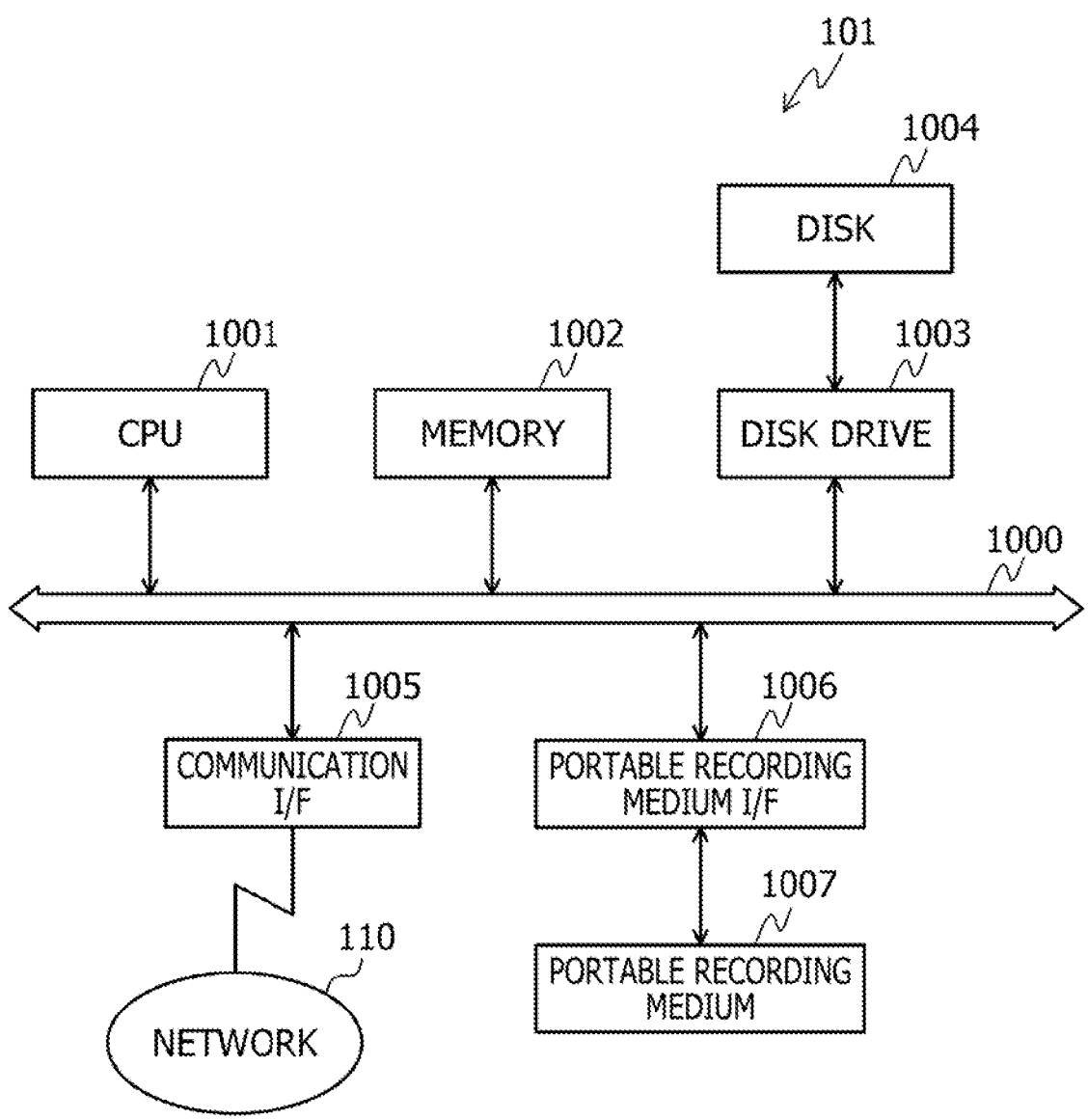
FIG. 10 is a block diagram illustrating an exemplary hardware configuration of the information processing device 101.

FIG. 10 is a block diagram illustrating an exemplary hardware configuration of the information processing device 101. In FIG. 10, the information processing device 101 includes a CPU 1001, a memory 1002, a disk drive 1003, a disk 1004, a communication interface (I/F) 1005, a portable recording medium I/F 1006, and a portable recording medium 1007. Furthermore, each of the configuration elements is respectively connected by a bus 1000.

Here, the CPU 1001 performs overall control of the information processing device 101. The CPU 1001 may include a plurality of cores. The memory 1002 includes, for example, a read only memory (ROM), a random access memory (RAM), a flash ROM, or the like. Specifically, for example, the flash ROM stores an operating system (OS) program, the ROM stores an application program, and the RAM is used as a work area for the CPU 1001. A program stored in the memory 1002 is loaded into the CPU 1001 to cause the CPU 1001 to execute coded processing.

The disk drive 1003 controls read and write of data from and into the disk 1004 under the control of the CPU 1001. The disk 1004 stores data written under the control of the disk drive 1003. The disk 1004 may be a magnetic disk, an optical disk, or the like, for example.

The communication I/F 1005 is connected to the network 110 through a communication line and is connected to an external computer (for example, another information processing device 101) via the network 110. Furthermore, the communication I/F 1005 manages an interface between the network 110 and the inside of the device, and controls input and output of data from the external computer.

The portable recording medium I/F 1006 controls read and write of data from and into the portable recording medium 1007 under the control of the CPU 1001. The portable recording medium 1007 stores data written under the control of the portable recording medium I/F 1006. Examples of the portable recording medium 1007 include a compact disc (CD)-ROM, a digital versatile disk (DVD), a universal serial bus (USB) memory, or the like.

Note that the information processing device 101 may include, for example, a solid state drive (SSD), an input device, a display, and the like in addition to the above-described configuration elements. Furthermore, the information processing device 101 may not include, for example, the disk drive 1003, the disk 1004, the portable recording medium I/F 1006, and the portable recording medium 1007 among the above-described configuration elements.

(Functional Configuration Example of Information Processing Device 101)

Figure 11:
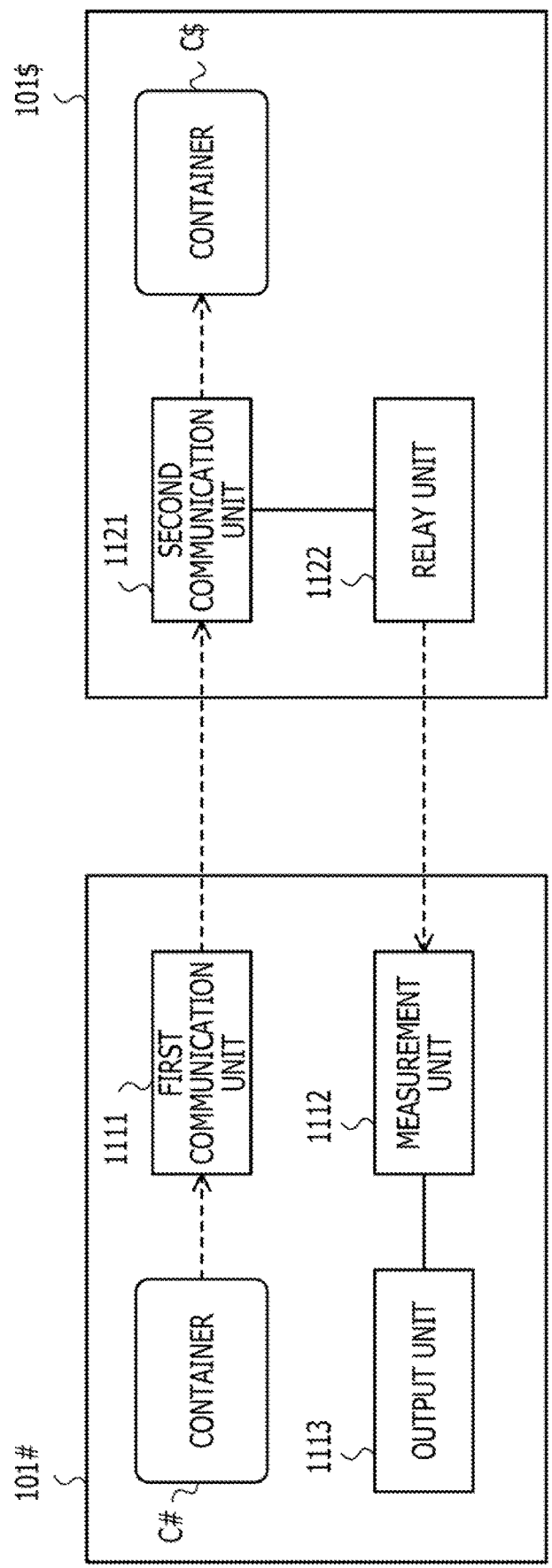
FIG. 11 is a block diagram illustrating a functional configuration example of the information processing device 101.

FIG. 11 is a block diagram illustrating a functional configuration example of the information processing device 101. First, a functional configuration example of the information processing device 101 # will be described. The information processing device 101 # is the information processing device 101 on the side of measuring the transmission delay of the packet exchanged between the devices.

In FIG. 11, information processing device 101 # includes a first communication unit 1111, a measurement unit 1112, and an output unit 1113. Specifically, for example, the first communication unit 1111 to the output unit 1113 implement the functions by causing the CPU 1001 to execute the program stored in a storage device such as the memory 1002, the disk 1004, or the portable recording medium 1007 of the information processing device 101 #, or by the communication I/F 1005. A processing result of each functional unit is stored in, for example, a storage device such as the memory 1002 or the disk 1004 of the information processing device 101 #.

The first communication unit 1111 adds first timer information at the time of transmission of a first packet to the first packet and transmits the first packet. Here, the first packet is the packet from information processing device 101 # to information processing device 101$. For example, the first packet is the packet P transmitted from the user application UA # operating on the container C # to the user application UA$ operating on the container C$.

The container C # is any of containers operating on the OS #. Furthermore, the container C$ is any of containers operating on the OS$. The first timer information indicates an elapsed time from activation of the OS # (information processing device 101 #) at the time of transmission of the first packet. For example, the first timer information is information indicating a timer value that continues to be counted up in a clock cycle from the time of booting the OS #, and indicates an elapsed time in nanosecond units.

Specifically, for example, when receiving the packet P, the first communication unit 1111 acquires the packet arrival time ta_1 from the OS #. Then, the first communication unit 1111 writes the packet arrival time ta_1 in the option header of the packet P and transfers the packet P. More specifically, for example, the first communication unit 1111 writes the packet arrival time ta_1 in the timestamp option header 820 of the packet P as illustrated in FIG. 8. The first communication unit 1111 corresponds to, for example, the packet processing module pm # illustrated in FIG. 4.

However, in a case where the time information recordable in the timestamp option header is a 32-bit integer, the elapsed time in nanosecond units is not able to be completely recorded. Furthermore, in a case of not using the elapsed time (millisecond) from the UTC 0 o'clock as the time information of the timestamp option header, the first bit is stipulated to be "1".

Therefore, the first communication unit 1111 may extract a lower 31-bit time from a 64-bit time (nanosecond units)

acquired from the OS #(kernel K #) and use the time as the time information, for example. In this case, the packet arrival time ta_1 is represented by the first bit "1" and the lower 31-bit bit string of the 64-bit bit string indicating the elapsed time in nanosecond units.

The measurement unit 1112 calculates the communication time from the information processing device 101 # to the information processing device 101$ on the basis of the first timer information, second timer information, third timer information, and first time information included in a second packet, and fourth timer information and second time information at the time of reception of the second packet.

Here, the second timer information indicates an elapsed time from activation of the OS$ (information processing device 101$), of when a second communication unit 1121 to be described below receives the first packet. For example, the second timer information is information indicating a timer value that continues to be counted up in a clock cycle from the time of booting the OS$, and indicates an elapsed time in nanosecond units.

The third timer information indicates an elapsed time from activation of the OS$, of when a relay unit 1122 to be described below receives notification information including the first timer information and the second timer information. For example, the third timer information indicates the elapsed time in nanosecond units. The first time information indicates a time (calendar time) in the OS$, of when the relay unit 1122 to be described below receives the notification information including the first timer information and the second timer information. For example, the first time information indicates the calendar time in nanosecond units.

The fourth timer information indicates an elapsed time from activation of the OS #, of when the measurement unit 1112 receives the second packet. For example, the fourth timer information indicates the elapsed time in nanosecond units. The second time information indicates the time (calendar time) in the OS #, of when the measurement unit 1112 receives the second packet. For example, the second time information indicates the calendar time in nanosecond units. The second packet is, for example, the time information packet TP including the packet arrival time ta_1, the packet arrival time tb_1, the notification time tb_2, and the notification time Tb_1.

Note that the time (calendar time) in the OS # and the time (calendar time) in the OS$ are assumed to be synchronized. However, the calendar time between the OS # and the OS$ may include an allowable error.

Next, the measurement unit 1112 calculates a first time indicating a time difference between the first timer information and the fourth timer information. Furthermore, the measurement unit 1112 calculates a second time indicating a time difference between the second timer information and the third timer information. Furthermore, the measurement unit 1112 calculates a third time indicating a time difference between the first time information and the second time information. Then, the measurement unit 1112 calculates the communication time from the information processing device 101 # to the information processing device 101$ by subtracting the calculated second time and third time from the calculated first time.

Specifically, for example, when receiving the time information packet TP, the measurement unit 1112 acquires the packet arrival time ta_2 and the packet arrival time Ta_1 from the OS #. Furthermore, the measurement unit 1112 reads the packet arrival time ta_1, the packet arrival time tb_1, the notification time tb_2, and the notification time Tb_1 from the payload 920 (see FIG. 9) of the received time information packet TP.

Next, the measurement unit 1112 calculates RTT (first time) by subtracting the packet arrival time ta_1 from the packet arrival time ta_2. The RTT corresponds to the time taken for all the processing from the transmission of the packet P (that is, from when the first communication unit 1111 receives the packet P) to when the measurement unit 1112 receives the time information packet TP.

However, in the case where the packet arrival time ta_1 indicates the lower 31-bit time of the 64-bit time (nanosecond units), the measurement unit 1112 ignores the upper 33 bits of the 64-bit time (nanosecond units) indicated by the packet arrival time ta_2, for example. Then, the measurement unit 1112 calculates the RTT from the lower 31-bit time of each of the packet arrival times ta_1 and ta_2. As a result, if the communication time does not exceed two seconds, the time difference between the packet arrival times ta_1 and ta_2 can be calculated assuming that the upper 33 bits are the same value.

Furthermore, the measurement unit 1112 calculates the transfer time D2 (second time) by subtracting the packet arrival time tb_1 from the notification time tb_2. The transfer time D2 corresponds to the time taken for the processing inside the OS$. Furthermore, the measurement unit 1112 calculates the transfer time D3 (third time) by subtracting the notification time Tb_1 from the packet arrival time Ta_1. The transfer time D3 corresponds to the time taken for transfer of the time information packet TP from the relay application RA$ to the measurement unit 1112.

Then, the measurement unit 1112 calculates the transfer time D1 by subtracting the calculated transfer time D2 and transfer time D3 from the calculated RTT. The transfer time D1 is a time needed from when the packet P is transmitted from the first communication unit 1111 to when the packet P is received by the second communication unit 1121, and represents the communication time (transmission delay) from the information processing device 101 # to the information processing device 101$. The measurement unit 1112 corresponds to the measurement application MA # illustrated in FIG. 4, for example.

The output unit 1113 outputs the calculation result calculated by the measurement unit 1112. Specifically, for example, the output unit 1113 may output transmission delay information that represents the user applications UA # and UA$ and the calculated transfer time D1 in association with each other. The transmission delay information may include information for specifying the containers C # and C$ in which each of the user applications UA # and UA$ is executed.

Examples of an output method by the output unit 1113 include storing the calculation result in a storage device such as the memory 1002 or the disk 1004, transmitting the calculation result to another computer by the communication I/F 1005, displaying the calculation result on a display (not illustrated), outputting the calculation result to a printer (not illustrated), and the like. The another computer is, for example, an administrator terminal, a user terminal (not illustrated), or the like in the information processing system 100. The output unit 1113 corresponds to the measurement application MA # illustrated in FIG. 4, for example.

Note that the information processing device 101 # may be implemented by the virtual machine VM that operates on the information processing device 101$, for example. In this case, the OS # is a guest OS of the virtual machine VM operating on the information processing device 101$.

Next, a functional configuration example of the information processing device 101$ will be described.

In FIG. 11, the information processing device 101$ includes the second communication unit 1121 and the relay unit 1122. Specifically, for example, the second communication unit 1121 and the relay unit 1122 implement the functions by causing the CPU 1001 to execute the program stored in a storage device such as the memory 1002, the disk 1004, or the portable recording medium 1007 of the information processing device 101$, or by the communication I/F 1005. The processing result of each functional unit is stored in, for example, a storage device such as the memory 1002 or the disk 1004 of the information processing device 101$.

In the case of receiving the first packet, the second communication unit 1121 transmits the notification information including the first timer information included in the first packet and the second timer information at the time of receiving the first packet to the relay unit 1122. As described above, the second timer information indicates the elapsed time from activation of the OS$, of when the second communication unit 1121 receives the first packet.

Specifically, for example, when receiving the packet P, the second communication unit 1121 acquires the packet arrival time tb_1 from the OS$. Furthermore, the second communication unit 1121 reads the packet arrival time ta_1 from the timestamp option header 820 (see FIG. 8) of the packet P. Next, the second communication unit 1121 generates the notification message m (see FIG. 5) including the packet arrival time ta_1 and the packet arrival time tb_1.

Then, the second communication unit 1121 transmits the generated notification message to the relay application RA$. Furthermore, the second communication unit 1121 transfers the received packet P to the user application UA$. The second communication unit 1121 corresponds to, for example, the packet reading module rm$ illustrated in FIG. 4.

The relay unit 1122 transmits the second packet including the first timer information and the second timer information included in the received notification information, the third timer information at the time of receiving the notification information, and the first time information at the time of receiving the notification information to the information processing device 101 #. As described above, the third timer information indicates the elapsed time from activation of the OS$, of when the relay unit 1122 receives the notification information. Furthermore, the first time information indicates the time (calendar time) in the OS$, of when the relay unit 1122 receives the notification information.

Specifically, for example, when receiving the notification message m, the relay unit 1122 acquires the notification time tb_2 and the notification time Tb_1 from the OS$. Furthermore, the relay unit 1122 reads the packet arrival time ta_1 and the packet arrival time tb_1 from the received notification message m. Next, the relay unit 1122 generates the time information packet TP including the packet arrival time ta_1, the packet arrival time tb_1, the notification time tb_2, and the notification time Tb_1. Then, the relay unit 1122 transmits the generated time information packet TP to the measurement application MA # of the information processing device 101 #. The relay unit 1122 corresponds to, for example, the relay application RA$ illustrated in FIG. 4.

Note that the information processing device 101$ may be implemented by the virtual machine VM that operates on the information processing device 101 #, for example. In this case, the OS$ is a guest OS of the virtual machine VM operating on the information processing device 101 #.

(Various Processing Procedures of Information Processing System 100)

Next, various processing procedures of the information processing system 100 according to the first embodiment will be described with reference to FIGS. 12 to 15. First, a packet processing procedure of the packet processing module pm # of the information processing device 101 # will be described with reference to FIG. 12.

Figure 12:
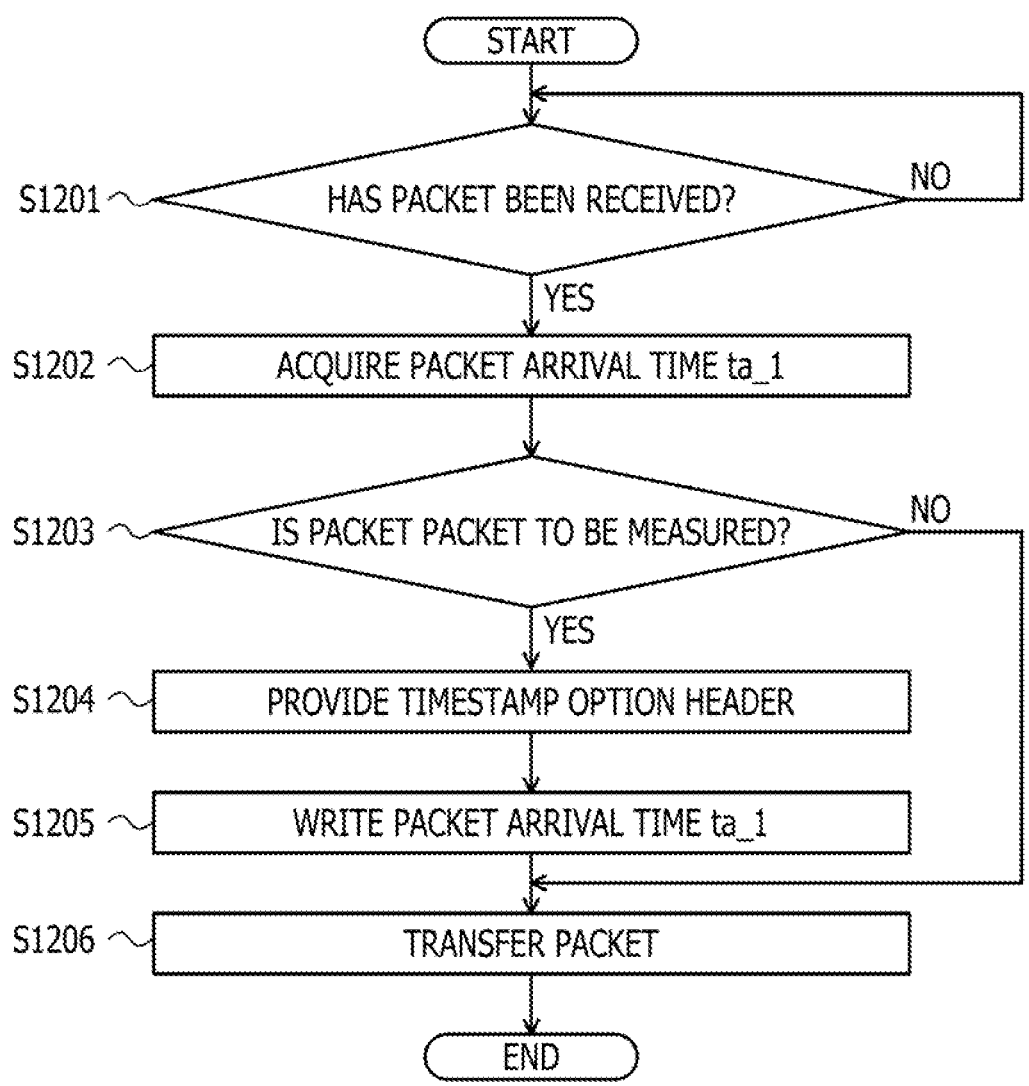
FIG. 12 is a flowchart illustrating an example of a packet processing procedure of a packet processing module pm # according to the first embodiment.

FIG. 12 is a flowchart illustrating an example of the packet processing procedure of the packet processing module pm # according to the first embodiment. In the flowchart in FIG. 12, first, the packet processing module pm # determines whether or not the packet P has been received (step S1201). The packet P is a packet transmitted from the user application UA # operating on the container C # to the user application UA$ operating on the container C$.

Here, the packet processing module pm # waits for reception of the packet P (step S1201: No). Then, in the case of receiving the packet P (step S1201: Yes), the packet processing module pm # acquires the packet arrival time ta_1 from the OS #(step S1202). Note that the processing in step S1202 may be executed immediately before step S1205.

Next, the packet processing module pm # determines whether or not the packet P is a packet to be measured (step S1203). The packet to be measured is a target packet for which the transmission delay is to be measured. Specifically, for example, the packet processing module pm # determines whether or not the packet P is the packet to be measured by referring to information (for example, a transmission source IP address, a transmission destination IP address, and a protocol type) of the IP header of the packet P. Furthermore, in the case where the packet to be measured is a TCP or a UDP, the packet processing module pm # determine whether or not the TCP or the UDP is the packet to be measured by referring to information (for example, a port number) of the protocol header of the packet P. Note that the information (the transmission source IP address, transmission destination IP address, port number, and the like) for identifying the packet to be measured is preset in the packet processing module pm #, for example.

Here, in the case where the packet P is not the packet to be measured (step S1203: No), the packet processing module pm # moves onto step S1206. On the other hand, in the case where the packet P is the packet to be measured (step S1203: Yes), the packet processing module pm # adds the timestamp option header to the packet P (step S1204).

Next, the packet processing module pm # writes the acquired packet arrival time ta_1 in the timestamp option header of the packet P (step S1205). At this time, the packet processing module pm # may further write an ID (for example, a 32-bit integer) for identifying its own module in the timestamp option header (for example, in an address area) of the packet P.

Then, the packet processing module pm # transfers the packet P (step S1206) and terminates the series of processing according to the present flowchart. Specifically, for example, the packet processing module pm # requests a protocol stack of the kernel K # to process the packet P. The protocol stack is a module that mounts a series of communication protocol groups for implementing communication on a computer.

Thereby, the packet processing module pm # corresponding to the container C # in which the user application UA # operates can acquire the packet arrival time ta_1 and write the packet arrival time ta_1 in the timestamp option header of the packet P.

Next, a packet reading processing procedure of the packet reading module rm$ of the information processing device 101$ will be described with reference to FIG. 13.

Figure 13:
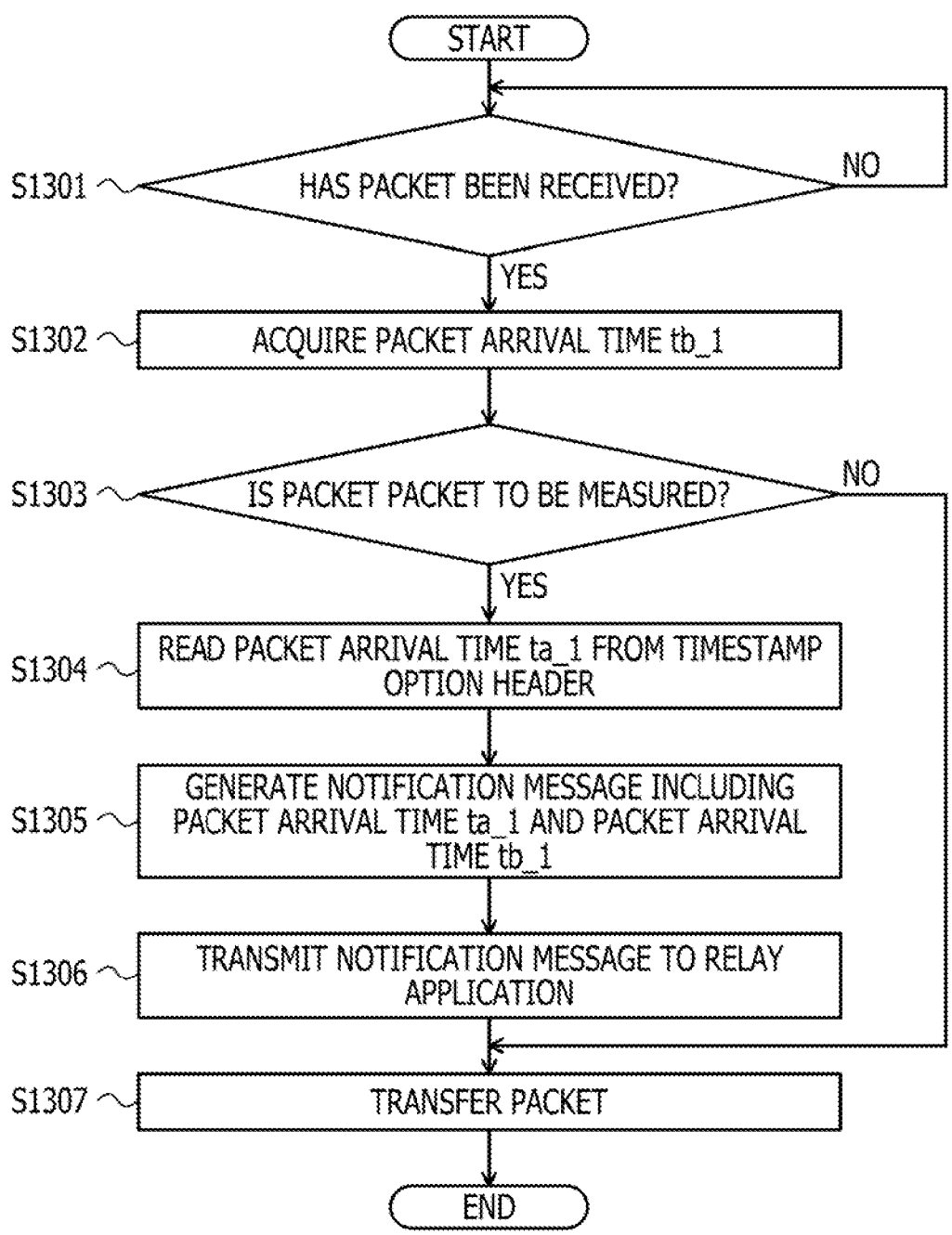
FIG. 13 is a flowchart illustrating an example of a packet reading processing procedure of a packet reading module rm$ according to the first embodiment.

FIG. 13 is a flowchart illustrating an example of a packet reading processing procedure of the packet reading module rm$ according to the first embodiment. In the flowchart of FIG. 13, first, the packet reading module rm$ determines whether or not the packet P has been received (step S1301). Here, the packet reading module rm$ waits for reception of the packet P (step S1301: No).

Then, in the case of receiving the packet P (step S1301: Yes), the packet reading module rm$ acquires the packet arrival time tb_1 from the OS$ (step S1302). Note that the processing in step S1302 may be executed immediately before step S1305.

Next, the packet reading module rm$ determines whether or not the packet P is the packet to be measured (step S1303). Specifically, for example, in the case where the packet P has the timestamp option header, the packet reading module rm$ determines that the packet P is the packet to be measured. On the other hand, in the case where there packet P has no timestamp option header, the packet processing module pm # determines that the packet P is not the packet to be measured.

Here, in the case where the packet P is not the packet to be measured (step S1303: No), the packet reading module rm$ moves onto step S1307. On the other hand, in the case where the packet P is the packet to be measured (step S1303: Yes), the packet reading module rm$ reads the packet arrival time ta_1 from the timestamp option header of the packet P (step S1304).

Note that, in the case where an ID of the packet processing module pm # is written in the timestamp option header of the packet P, the packet reading module rm$ may further read the ID from the timestamp option header of the packet P.

Then, the packet reading module rm$ generates the notification message m including the read packet arrival time ta_1 and the acquired packet arrival time tb_1 (step S1305). The notification message m may include the ID of the packet processing module pm #.

Next, the packet reading module rm$ transmits the generated notification message m to the relay application RA$ (step S1306). Then, the packet reading module rm$ transfers the received packet P to the user application UA$ (step S1307) and terminates the series of processing according to the present flowchart. Specifically, for example, the packet reading module rm$ requests a protocol stack of the kernel K$ to process the packet P.

Thereby, the packet reading module rm$ corresponding to the container C$ in which the user application UA$ operates can acquire the packet arrival time ta_1 and the packet arrival time tb_1 and notify the relay application RA$ of the packet arrival time ta_1 and the packet arrival time tb_1.

Next, a time information relay processing procedure of the relay application RA$ of the information processing device 101$ will be described with reference to FIG. 14.

Figure 14:
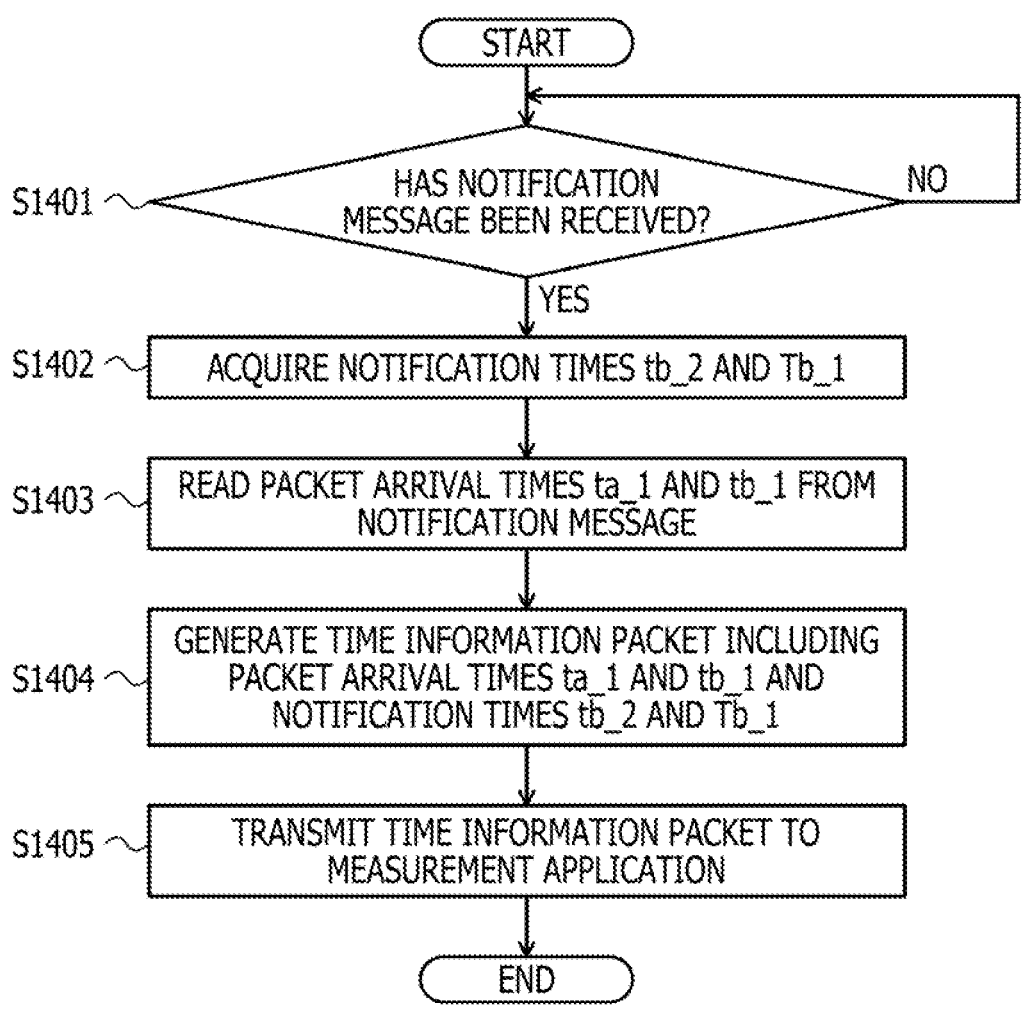
FIG. 14 is a flowchart illustrating an example of a time information relay processing procedure of a relay application RA$ according to the first embodiment.

FIG. 14 is a flowchart illustrating an example of a time information relay processing procedure of the relay application RA$ according to the first embodiment. In the flowchart of FIG. 14, first, the relay application RA$ determines whether or not the notification message m has been received (step S1401). Here, the relay application RA$ waits for reception of the notification message m (step S1401: No).

Then, in the case of receiving the notification message m (step S1401: Yes), the relay application RA$ acquires the notification time tb_2 and the notification time Tb_1 from the OS$ (step S1402). Next, the relay application RA$ reads the packet arrival time ta_1 and the packet arrival time tb_1 from the received notification message m (step S1403).

Note that, in the case where the notification message m includes the ID of the packet processing module pm #, the relay application RA$ may further read the ID from the notification message m.

The relay application RA$ generates the time information packet TP including the packet arrival time ta_1, the packet arrival time tb_1, the notification time tb_2, and the notification time Tb_1 in the payload (step S1404). The time information packet TP may include the ID of the packet processing module pm #.

Then, the relay application RA$ transmits the generated time information packet TP to the measurement application MA # of the information processing device 101 #(step S1405) and terminates the series of processing according to the present flowchart.

Thereby, the relay application RA$ can acquire and transmit the packet arrival time ta_1, the packet arrival time tb_1, the notification time tb_2, and the notification time Tb_1 to the measurement application MA # of the information processing device 101 #.

Next, a communication time calculation processing procedure of the measurement application MA # of the information processing device 101 # will be described with reference to FIG. 15.

Figure 15:
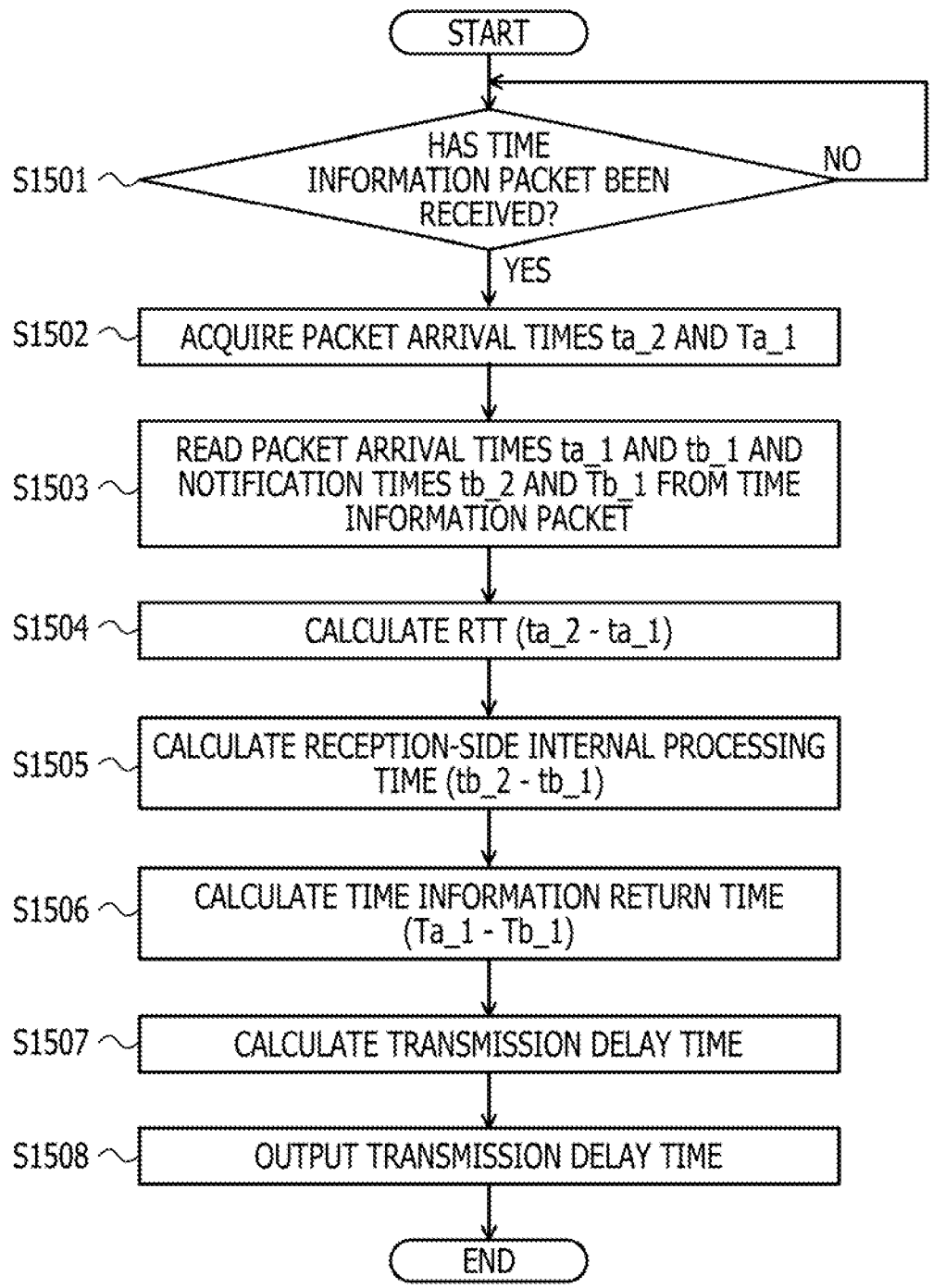
FIG. 15 is a flowchart illustrating an example of a communication time calculation processing procedure of a measurement application MA # according to the first embodiment.

FIG. 15 is a flowchart illustrating an example of a communication time calculation processing procedure of the measurement application MA # according to the first embodiment. In the flowchart in FIG. 15, first, the measurement application MA # determines whether or not the time information packet TP has been received (step S1501). Here, the measurement application MA # waits for reception of the time information packet TP (step S1501: No).

Then, when receiving the time information packet TP (step S1501: Yes), the measurement application MA # acquires the packet arrival time ta_2 and the packet arrival time Ta_1 from the OS #(step S1502). Next, the measurement application MA # reads the packet arrival time ta_1, the packet arrival time tb_1, the notification time tb_2, and the notification time Tb_1 from the received time information packet TP (step S1503).

Then, for example, the measurement application MA # calculates the RTT by subtracting the packet arrival time ta_1 from the packet arrival time ta_2 (step S1504). Next, the measurement application MA # calculates a reception-side internal processing time (transfer time D2) by subtracting the packet arrival time tb_1 from the notification time tb_2 (step S1505).

Next, the measurement application MA # calculates a time information return time (transfer time D3) by subtracting the notification time Tb_1 from the packet arrival time Ta_1 (step S1506). Next, the measurement application MA # calculates a transmission delay time (transfer time D1) by subtracting the calculated reception-side internal processing time and time information return time from the calculated RTT (step S1507).

Then, the measurement application MA # outputs the calculated transmission delay time (step S1508) and terminates the series of processing according to the present flowchart. Thereby, the transmission delay time of the packet P transmitted from the user application UA # operating on the container C # to the user application UA$ operating on the container C$ can be calculated.

Note that, in the case where the time information packet TP includes the ID of the packet processing module pm #, the container C # and the user application UA # can be specified from the ID. By using the ID of the packet processing module pm # for specifying the container C # and the user application UA #, the data amount can be suppressed as compared with a case of using the transmission source and transmission destination addresses of the packet P or the like.

As described above, according to the information processing system 100 of the first embodiment, the packet processing module pm # of the information processing device 101 # can add the first timer information (packet arrival time ta_1) indicating the elapsed time from activation of the OS # at the time of transmission of the packet P to the packet P and transmit the packet P. The packet P is a user packet transmitted from the user application UA # operating on the container C # to the user application UA$ operating on the container C$. The packet processing module pm # is a communication module in the kernel K # of the OS #, the packet processing module pm # being provided corresponding to the virtual NIC for connection between the container C # and the OS #.

Thereby, the timer time (packet arrival time ta_1) of when the packet P is transmitted from the information processing device # can be recorded in the packet P as the time information.

Furthermore, the packet reading module rm$ of the information processing device 101$ can transmit the notification message m including the first timer information included in the received packet P and the second timer information (packet arrival time tb_1) indicating the elapsed time from activation of the OS$ at the time of reception of the packet P to the relay application RA$ of the information processing device 101$. The packet reading module rm$ is a communication module in the kernel K$ of the OS$, the packet reading module rm$ being provided corresponding to the virtual NIC for connection between the container C$ and the OS$.

Thereby, notification of the timer time (packet arrival time ta_1) and the timer time (packet arrival time tb_1) of when the packet P is received in the information processing device 101$ can be provided to the relay application RA$ as the time information by message communication inside the device.

Furthermore, the relay application RA$ of the information processing device 101$ can acquire the third timer information (notification time tb_2) indicating the elapsed time from activation of the OS$ at the time of reception of the notification message m and the first time information (notification time Tb_1) indicating the calendar time in the OS$ at the time of reception of the notification message m.

Thereby, the timer time (tb_2) and the calendar time (Tb_1) of when the notification message m is received inside the information processing device 101$ can be acquired as the time information.

Furthermore, the relay application RA$ of the information processing device 101$ can transmit the time information packet TP including the first timer information and the second timer information included in the received notification message m and the acquired third timer information and first time information to the measurement application MA # of the information processing device 101 #.

Thereby, notification of the timer times (ta_1, tb_1, and tb_2) and the calendar time (Tb_1) can be provided as the time information to the measurement application MA # of the information processing device 101 # by inter-application data communication.

Furthermore, the measurement application MA # of the information processing device 101 # can acquire the fourth timer information (ta_2) indicating the elapsed time from activation of the OS # at the time of reception of the time information packet TP and the second time information (Ta_1) indicating the calendar time in the OS # at the time of reception of the time information packet TP.

Thereby, the timer time (ta_2) and the calendar time (Ta_1) of when the time information packet TP is received by the information processing device 101 # can be acquired as the time information.

Furthermore, the measurement application MA # of the information processing device 101 # can calculate the communication time from the information processing device 101 # to the information processing device 101$ on the basis of the various types of time information (ta_1, ta_2, tb_1, tb_2, Tb_1, and Ta_1). Specifically, for example, the measurement application MA # calculates the RTT (first time) indicating the time difference between the packet arrival time ta_1 and the packet arrival time ta_2. Furthermore, the measurement application MA # calculates the transfer time D2 (second time) indicating the time difference between the packet arrival time tb_1 and the notification time tb_2. Furthermore, the measurement application MA # calculates the transfer time D3 (third time) indicating the time difference between notification time Tb_1 and packet arrival time Ta_1. Then, the measurement application MA # calculates the transfer time D1 representing the communication time from the information processing device 101 # to the information processing device 101$ by subtracting the calculated transfer time D2 and transfer time D3 from the calculated RTT.

Thereby, the time needed for communication between the information processing devices 101 # and 101$ (transmission delay) can be measured without adding a special mechanism to the user applications UA # and UA$ that perform the communication to be measured. Furthermore, the transmission delay of the packet exchanged between the information processing devices 101 # and 101$ can be measured even in the environment where the modules (packet processing module pm # and packet reading module rm$) that process and read the packet do not have the IP address and can read only the timer time.

Furthermore, the packet processing module pm # of the information processing device 101 # can write the first timer information (packet arrival time ta_1) in the timestamp option header of the packet P.

Thereby, the timer time (packet arrival time ta_1) of when the packet P is transmitted from the information processing device # can be recorded using the available option header of the IP packet. Furthermore, the packet to be measured can be made discriminative.

Furthermore, the packet processing module pm # can write the lower 31-bit bit string of the 64-bit bit string indicating the elapsed time in nanosecond units from activation of the OS # as the first timer information (packet arrival time ta_1) in the timestamp option header.

Thereby, the time in nanosecond units can be recorded on the basis of the idea that the upper bit information can be ignored to some extent in the communication with the transmission delay that does not exceed two seconds even in the case where the time information recordable in the timestamp option header is a 32-bit integer. Furthermore, since the time in nanosecond units can be recorded, the communication time can be measured even for the communication with the transmission delay that is less than one millisecond, such as a packet exchanged between containers operating on different OSs in the same physical server, for example.

Furthermore, the measurement application MA # of the information processing device 101 # can output the calculated communication time from the information processing device 101 # to the information processing device 101$. Specifically, for example, the measurement application MA # outputs the calculated communication time (transfer time D1) in association with the user applications UA # and UA$.

Thereby, the information for diagnosing the soundness of a cloud system that executes the user applications UA # and UA$ can be provided.

From the above configurations, the information processing system 100 according to the first embodiment can measure the transmission delay of the packet exchanged between the containers operating on different OSs. Thereby, the information for diagnosing the soundness of a cloud system can be collected, which can be led to improvement of the quality of service (QoS).

Second Embodiment

Next, a communication time calculation method according to a second embodiment will be described. In the second embodiment, a case of using tunneling for inter-device communication for a packet P will be described. Note that a part similar to the part described in the first embodiment is denoted with the same reference numeral, and illustration and description thereof are omitted.

Figure 16:
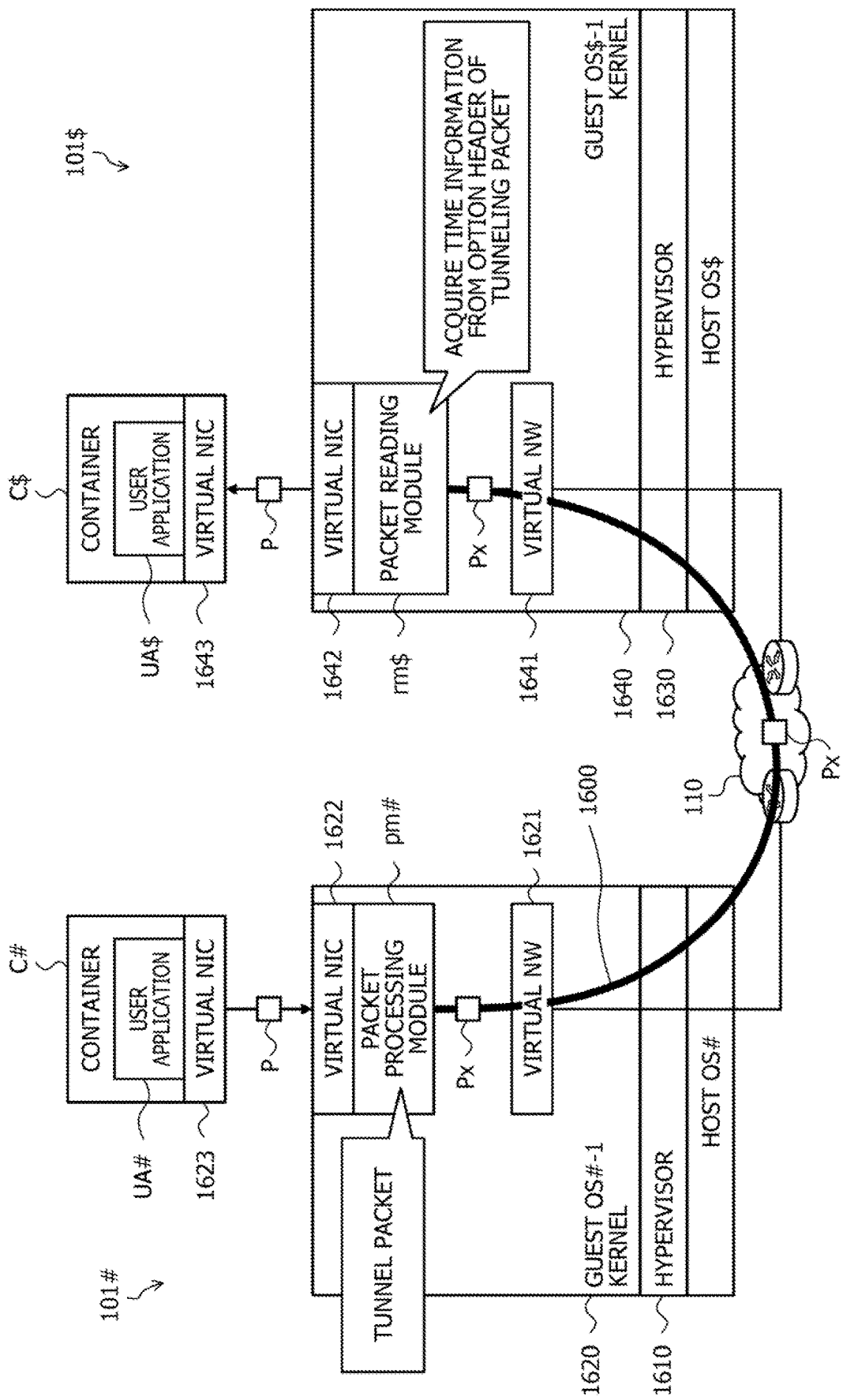
FIG. 16 is an explanatory diagram illustrating an example of a communication time calculation method according to a second embodiment.

FIG. 16 is an explanatory diagram illustrating an example of a communication time calculation method according to the second embodiment. In FIG. 16, a guest OS #-1 is operating on a hypervisor 1610 of an information processing device 101 #. Furthermore, a container C # is executed on the guest OS #-1. Kernel 1620 of the guest OS #-1 includes a virtual NW 1621 and a virtual NIC 1622.

The virtual NW 1621 is a virtual network inside the information processing device 101 #. The virtual NIC 1622 is a virtual NIC for connection between the container C # and the guest OS #-1, and is connected to face a virtual NIC 1623 for the container C #. A packet processing module pm # is provided corresponding to the virtual NIC 1622 in the kernel 1620 of the guest OS #-1.

Furthermore, a guest OS$-1 is operating on a hypervisor 1630 of an information processing device 101$. Furthermore, a container C$ is running on the guest OS$-1. Kernel 1640 of the guest OS$-1 includes a virtual NW 1641 and a virtual NIC 1642.

The virtual NW 1641 is a virtual network inside the information processing device 101$. The virtual NIC 1642 is a virtual NIC for connection between the container C$ and the guest OS$-1, and is connected to face a virtual NIC 1643 for the container C$. A packet reading module rm$ is provided corresponding to the virtual NIC 1642 in the kernel 1640 of the guest OS$-1.

Here, a tunnel 1600 is established between the packet processing module pm # and the packet reading module rm$ by a tunneling technology. The packet processing module pm # tunnels the packet P using the tunnel 1600 and transmits the packet P to the packet reading module rm$.

Tunneling is to communicate by encapsulating a packet between two points connected via a network (for example, a network 110). The encapsulation is to add a new header to an original packet to generate a packet in which the original packet is regarded as a data part.

The packet processing module pm # encapsulates the packet P to generate a new packet (packet Px in FIG. 16), thereby to store time information (packet arrival time ta_1) in the new packet without processing the packet P itself such as adding an option header.

Note that, although not illustrated in FIG. 16, a measurement application MA # is executed in a user space of the guest OS #-1, and a relay application RA$ is executed in the user space of the guest OS$-1.

Here, a data structure example of the encapsulated packet will be described with reference to FIG. 17. In the following description, a packet obtained by encapsulating the packet P may be referred to as "tunneling packet".

Figure 17:
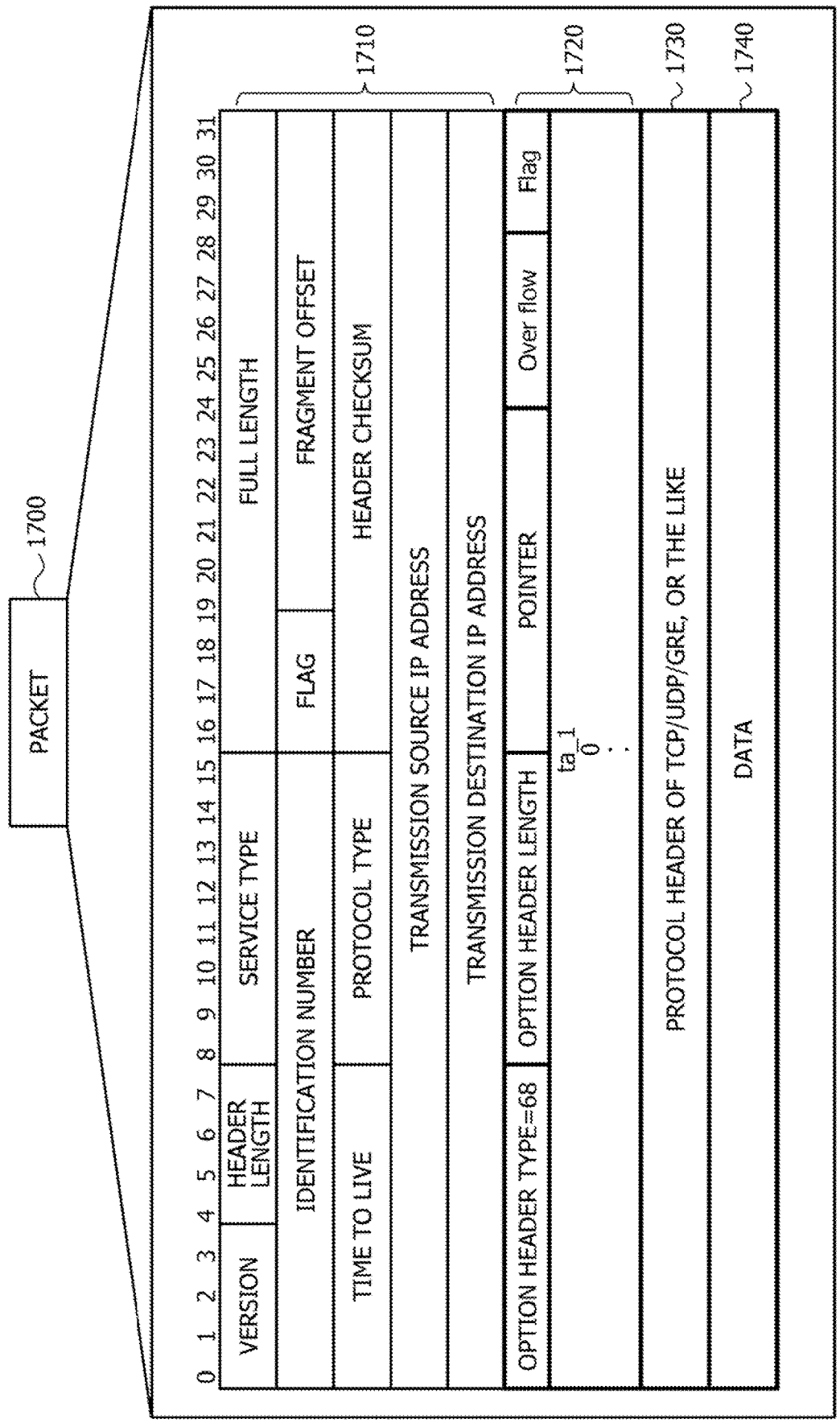
FIG. 17 is an explanatory diagram illustrating a data structure example of an encapsulated packet.

FIG. 17 is an explanatory diagram illustrating a data structure example of an encapsulated packet. In FIG. 17, a packet 1700 is a packet obtained by encapsulating the packet P, and includes an IP header 1710, a timestamp option header 1720, a protocol header 1730, and a payload 1740.

The payload 1740 includes the packet P. That is, the packet 1700 is a packet obtained by providing the new header 1710 to the original packet P and regarding the original packet P as the payload 1740 (data part). The time information (packet arrival time ta_1) is written in the timestamp option header 1720.

(Various Processing Procedures of Information Processing System 100)

Next, various processing procedures of the information processing system 100 according to the second embodiment will be described. First, a packet processing procedure of the packet processing module pm # of the information processing device 101 # will be described with reference to FIG. 18.

Figure 18:
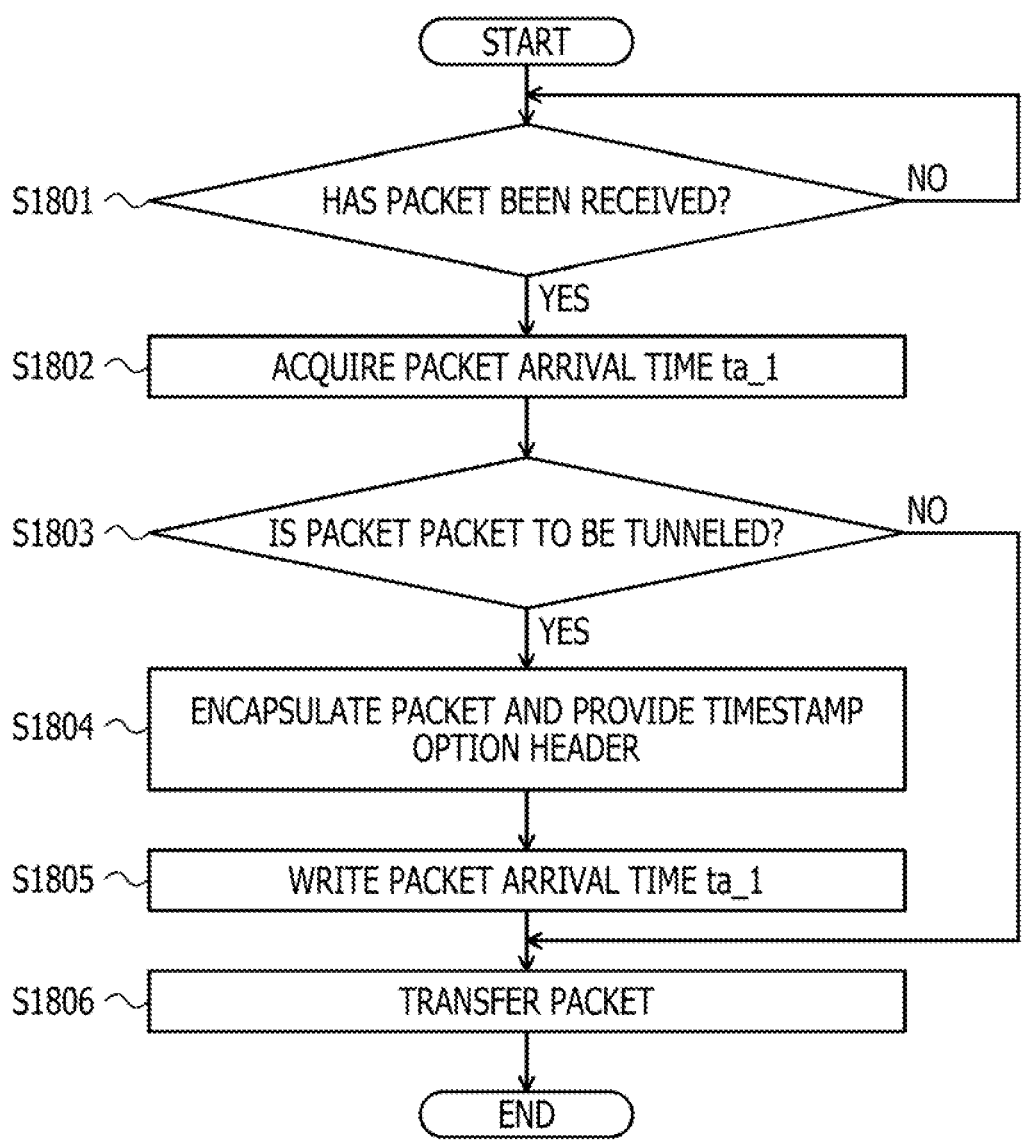
FIG. 18 is a flowchart illustrating an example of a packet processing procedure of a packet processing module pm # according to the second embodiment.

FIG. 18 is a flowchart illustrating an example of a packet processing procedure of the packet processing module pm # according to the second embodiment. In the flowchart in FIG. 18, first, the packet processing module pm # determines whether or not the packet P has been received (step S1801).

Here, the packet processing module pm # waits for reception of the packet P (step S1801: No). Then, in the case of receiving the packet P (step S1801: Yes), the packet processing module pm # acquires the packet arrival time ta_1 from the OS #(step S1802). Note that the processing in step S1802 may be executed immediately before step S1805.

Next, the packet processing module pm # determines whether or not the packet P is a packet to be tunneled (step S1803). The packet to be tunneled is a target packet for which a transmission delay is to be measured. Specifically, for example, the packet processing module pm # determines whether or not the packet P is the packet to be tunneled by referring to information of an IP header and the protocol header of the packet P.

Here, in the case where the packet P is not the packet to be tunneled (step S1803: No), the packet processing module pm # moves onto step S1806. On the other hand, in the case where the packet P is the packet to be tunneled (step S1803: Yes), the packet processing module pm # encapsulates the packet P and adds the timestamp option header to the packet (step S1804).

Next, the packet processing module pm # writes the acquired packet arrival time ta_1 in the timestamp option header of the packet obtained by encapsulating the packet P (step S1805). At this time, the packet processing module pm # may further write an ID for identifying its own module in the timestamp option header of the packet P.

Then, the packet processing module pm # transfers the encapsulated packet or the packet P (step S1806) and terminates the series of processing according to the present flowchart.

Thereby, the packet processing module pm # can encapsulate the packet P and write the packet arrival time ta_1 in the timestamp option header of the encapsulated packet (the packet having the packet P as the data part).

Next, a packet reading processing procedure of the packet reading module rm$ of the information processing device 101$ will be described with reference to FIG. 19.

Figure 19:
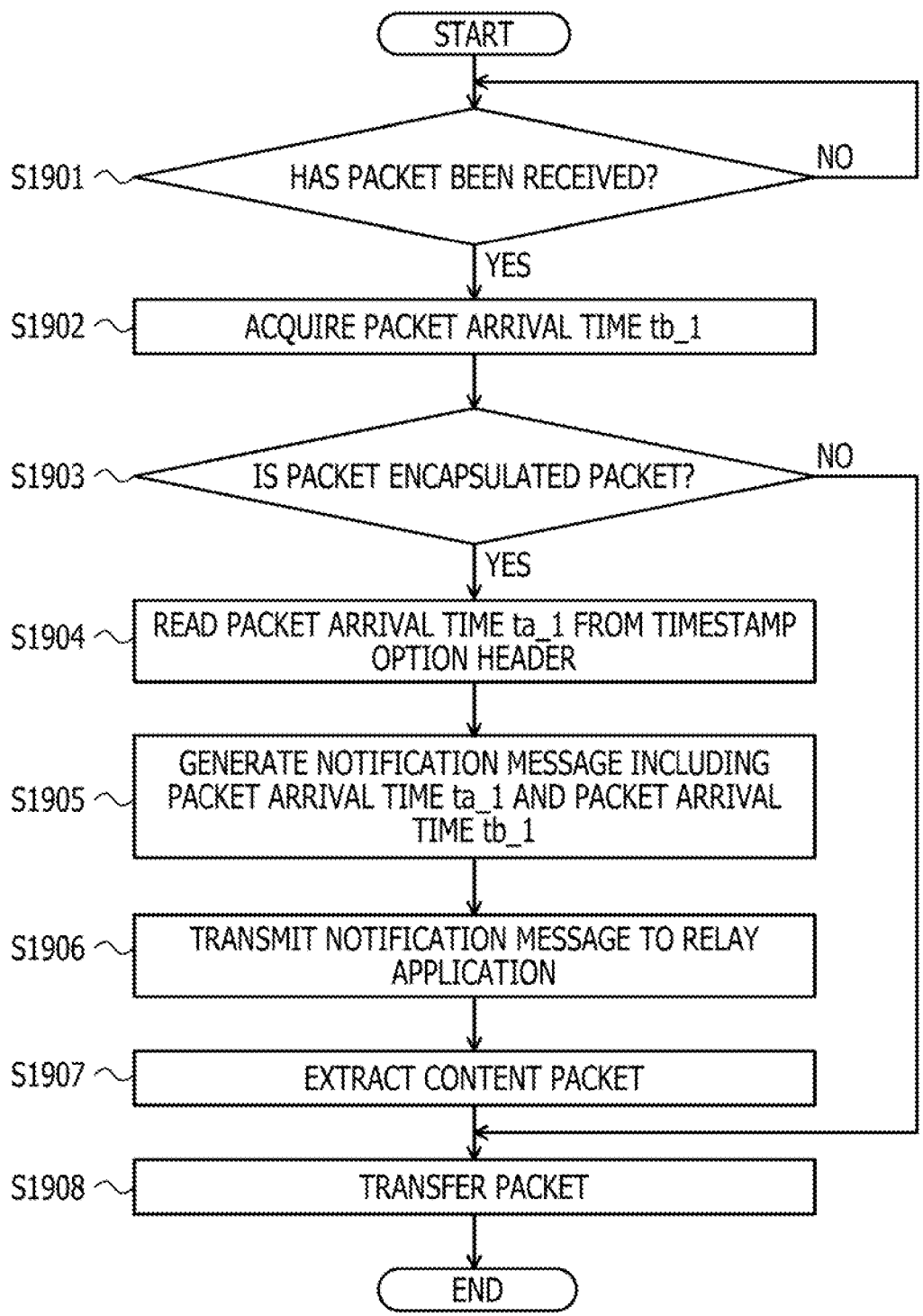
FIG. 19 is a flowchart illustrating an example of a packet reading processing procedure of a packet reading module rm$ according to the second embodiment.

FIG. 19 is a flowchart illustrating an example of a packet reading processing procedure of the packet reading module rm$ according to the second embodiment. In the flowchart of FIG. 19, first, the packet reading module rm$ determines whether or not the packet has been received (step S1901). Here, the packet reading module rm$ waits for reception of the packet (step S1901: No).

Then, in the case of receiving the packet (step S1901: Yes), the packet reading module rm$ acquires a packet arrival time tb_1 from the OS$ (step S1902). Note that the processing in step S1902 may be executed immediately before step S1905.

Next, the packet reading module rm$ determines whether or not the received packet is the encapsulated packet (step S1903). Specifically, for example, the packet reading module rm$ determines whether or not the received packet is the encapsulated packet by referring to a protocol number of the IP header of the packet. As an example, in the case where the protocol number is a generic routing encapsulation (GRE) number, the packet reading module rm$ determines that the packet is the encapsulated packet.

Here, in the case where the packet is not the encapsulated packet (step S1903: No), the packet reading module rm$ moves onto step S1908. On the other hand, in the case where the packet is the encapsulated packet (step S1903: Yes), the packet reading module rm$ reads the packet arrival time ta_1 from the timestamp option header of the encapsulated packet (step S1904).

Note that, in the case where an ID of the packet processing module pm # is written in the timestamp option header of the encapsulated packet, the packet reading module rm$ may further read the ID from the timestamp option header.

Then, the packet reading module rm$ generates the notification message m including the read packet arrival time ta_1 and the acquired packet arrival time tb_1 (step S1905). The notification message m may include the ID of the packet processing module pm #.

Next, the packet reading module rm$ transmits the generated notification message m to the relay application RA$ (step S1906). Next, the packet reading module rm$ extracts the packet P of the content (data part) from the encapsulated packet (step S1907).

Then, the packet reading module rm$ transfers the received packet P (unencapsulated packet) or the extracted packet P to the user application UA$ (step S1908) and terminates the series of processing according to the present flowchart.

Thereby, the packet reading module rm$ can acquire the packet arrival time ta_1 and the packet arrival time tb_1 and notify the relay application RA$ of the packet arrival time ta_1 and the packet arrival time tb_1.

Note that the time information relay processing procedure of the relay application RA$ is similar to the time information relay processing procedure of the relay application RA$ according to the first embodiment (see FIG. 14), and thus illustration and description thereof are omitted. Furthermore, the communication time calculation processing procedure of the measurement application MA # is similar to the communication time calculation processing procedure of the measurement application MA # according to the first embodiment (see FIG. 15), and thus illustration and description thereof are omitted.

As described above, according to the information processing system 100 of the second embodiment, the time option header is added to the packet obtained by encapsulating the packet P, and the time information (packet arrival time ta_1) can be stored in the time option header. Thereby, the transmission delay of the packet P can be measured without processing the packet P itself such as adding the option header.

Third Embodiment

Next, a communication time calculation method according to a third embodiment will be described. In the third embodiment, a case where a relay application RA$ accumulates time information of each of a plurality of packets P and collectively transmits the time information of the plurality of packets P to a measurement application MA # will be described. Note that a part similar to the part described in the first and second embodiments is denoted with the same reference numeral, and illustration and description thereof are omitted.

Figure 20:
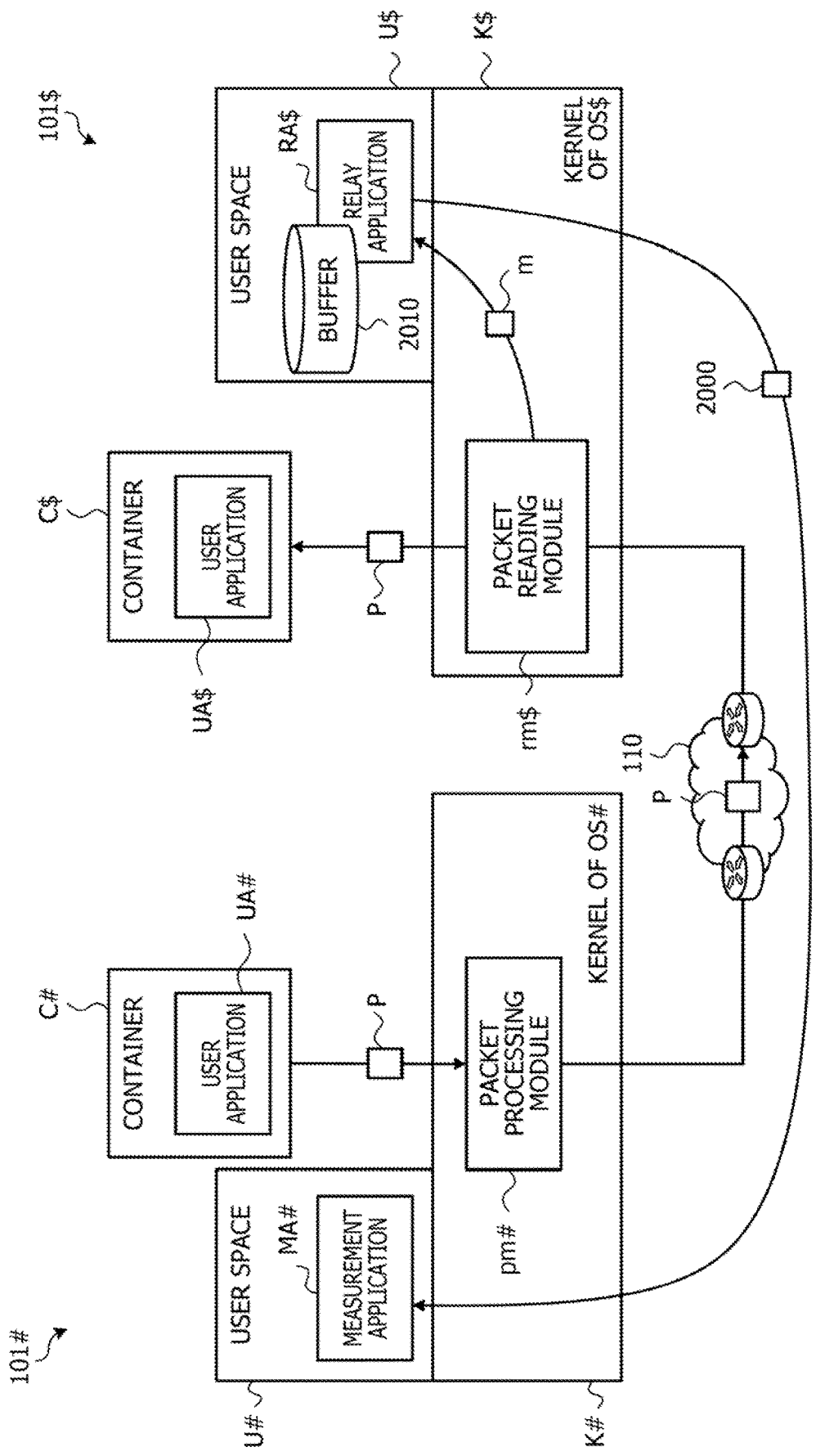
FIG. 20 is an explanatory diagram illustrating an example of a communication time calculation method according to a third embodiment.

FIG. 20 is an explanatory diagram illustrating an example of a communication time calculation method according to the third embodiment. In FIG. 20, the relay application RA$ includes a buffer 2010. The buffer 2010 is a storage unit that stores time information (ta_1, tb_1, tb_2, and Tb_1) of each packet P.

The relay application RA$ accumulates the time information (ta_1, tb_1, tb_2, and Tb_1) in the buffer 2010 every time receiving a notification message m from a packet reading module rm$. The time information (ta_1, tb_1, tb_2, and Tb_1) is combination data including a packet arrival time ta_1, a packet arrival time tb_1, a notification time tb_2, and a notification time Tb_1.

The packet arrival time ta_1 and the packet arrival time tb_1 are included in the notification message m received from the packet reading module rm$. The notification time tb_2 indicates an elapsed time from activation of an OS$, of when the relay application RA$ receives the notification message m. The notification time Tb_1 indicates a time (calendar time) in the OS$, of when the relay application RA$ receives the notification message m.

In the case where a predetermined number of pieces of time information (ta_1, tb_1, tb_2, and Tb_1) is accumulated in the buffer 2010, the relay application RA$ transmits a time information aggregation packet 2000 (third packet) including the predetermined number of pieces of time information (ta_1, tb_1, tb_2, and Tb_1) to the measurement application MA # of an information processing device 101 #.

Here, a data structure example of the time information aggregation packet 2000 will be described with reference to FIG. 21.

Figure 21:
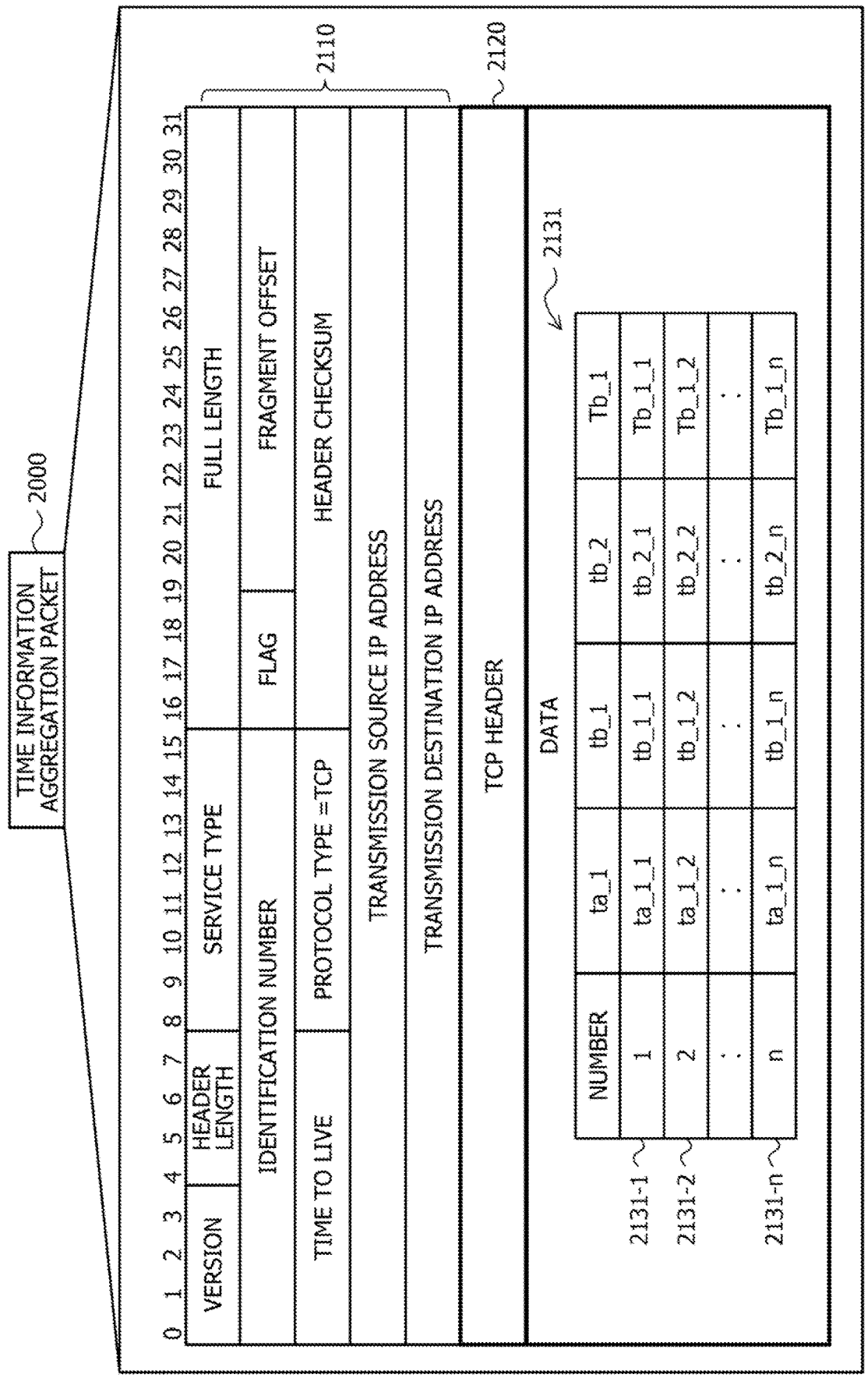
FIG. 21 is an explanatory diagram illustrating a data structure example of a time information aggregation packet 2000.

FIG. 21 is an explanatory diagram illustrating a data structure example of the time information aggregation packet 2000. In FIG. 21, the time information aggregation packet 2000 includes an IP header 2110, a TCP header 2120, and a payload 2130. A time information list 2131 is stored in the payload 2130.

The time information list 2131 includes pieces of time information 2131-1 to 2131-$n$ ($n$ is a natural number of 2 or more). Each of the pieces of time information 2131-1 to 2131-$n$ is combination data including the packet arrival time ta_1, the packet arrival time tb_1, the notification time tb_2, and the notification time Tb_1.

For example, the packet arrival time ta_1 of the time information 2131-1 is "ta_1_1". The packet arrival time tb_1 of the time information 2131-1 is "tb_1_1". The notification time tb_2 of the time information 2131-1 is "tb_2_1" The notification time Tb_1 of the time information 2131-1 is "Tb_1_1".

In the case of receiving the time information aggregation packet 2000, the measurement application MA # of the information processing device 101 # calculates a communication time from the information processing device 101 # to an information processing device 101$ for every piece of time information included in the time information aggregation packet 2000.

Specifically, for example, the measurement application MA # calculates, for each time information, a transmission delay time of the packet P transmitted and received between containers C # and C$ on the basis of the time information, and a packet arrival time ta_2' and a packet arrival time Ta_1'.

Here, the packet arrival time ta_2' is timer information (fifth timer information) indicating an elapsed time from activation of an OS #, of when the measurement application MA # receives the time information aggregation packet 2000. The packet arrival time Ta_1' is time information (third time information) indicating a time (calendar time) in the OS #, of when the measurement application MA # receives the time information aggregation packet 2000.

More specifically, for example, when receiving the time information aggregation packet 2000, the measurement application MA # acquires the packet arrival time ta_2' and the packet arrival time Ta_1' from the OS #. Furthermore, the measurement application MA # reads the time information list 2131 from the payload 2130 (see FIG. 21) of the received time information aggregation packet 2000.

Next, the measurement application MA # refers to time information 2131-$i$ in the time information list 2131 and specifies a packet arrival time ta_1_$i$, a packet arrival time tb_1_$i$, a notification time tb_2_$i$, and a notification time Tb_1_$i$ ($i$=1, 2, . . . , n). Then, the measurement application MA # calculates RTT_i by subtracting the packet arrival time ta_1_$i$ from the packet arrival time ta_2'.

Furthermore, the measurement application MA # calculates a transfer time D2_$i$ by subtracting the packet arrival time tb_1_$i$ from the notification time tb_2_$i$. Furthermore, the measurement application MA # calculates a transfer time D3_$i$ by subtracting the notification time Tb_1_$i$ from the packet arrival time Ta_1'. Then, the measurement application MA # calculates a transfer time D1_$i$ by subtracting the calculated transfer time D2_$i$ and transfer time D3_$i$ from the calculated RTT_i.

The transfer time D1_$i$ represents the communication time from the information processing device 101 # to the information processing device 101$ (the transmission delay time between the containers C # and C$) corresponding to the time information 2131-$i$ of the pieces of time information 2131-1 to 2131-$n$ in the time information list 2131.

The measurement application MA # calculates each of transfer times D1_1 to D1_$n$ for each of the pieces of time information 2131-1 to 2131-$n$ in the time information list 2131, for example. Then, the measurement application MA # outputs a transmission delay list including each of the calculated transfer times D1_1 to D1_$n$, for example.

Here, a specific example of the transmission delay list will be described with reference to FIG. 22.

FIG. 22 is an explanatory diagram illustrating a specific example of the transmission delay list. In FIG. 22, a transmission delay list 2200 includes transmission delay times D1_1 to D1_$n$. The transmission delay times D1_1 to D1_$n$ correspond to the transfer times D1_1 to D1_$n$, respectively.

According to the transmission delay list 2200, the transmission delay time between the containers C # and C$ can be statistically analyzed and a moving average or a weighted moving average of the transmission delay times, or the like can be obtained, for example. Note that, although illustration is omitted, the transmission delay list 2200 may include information for specifying the user applications UA # and UA$ and containers C # and C$, for example.

(Various Processing Procedures of Information Processing System 100)

Next, various processing procedures of an information processing system 100 according to the third embodiment will be described. First, a time information relay processing procedure of the relay application RA$ of the information processing device 101$ will be described with reference to FIG. 23.

Figure 23:
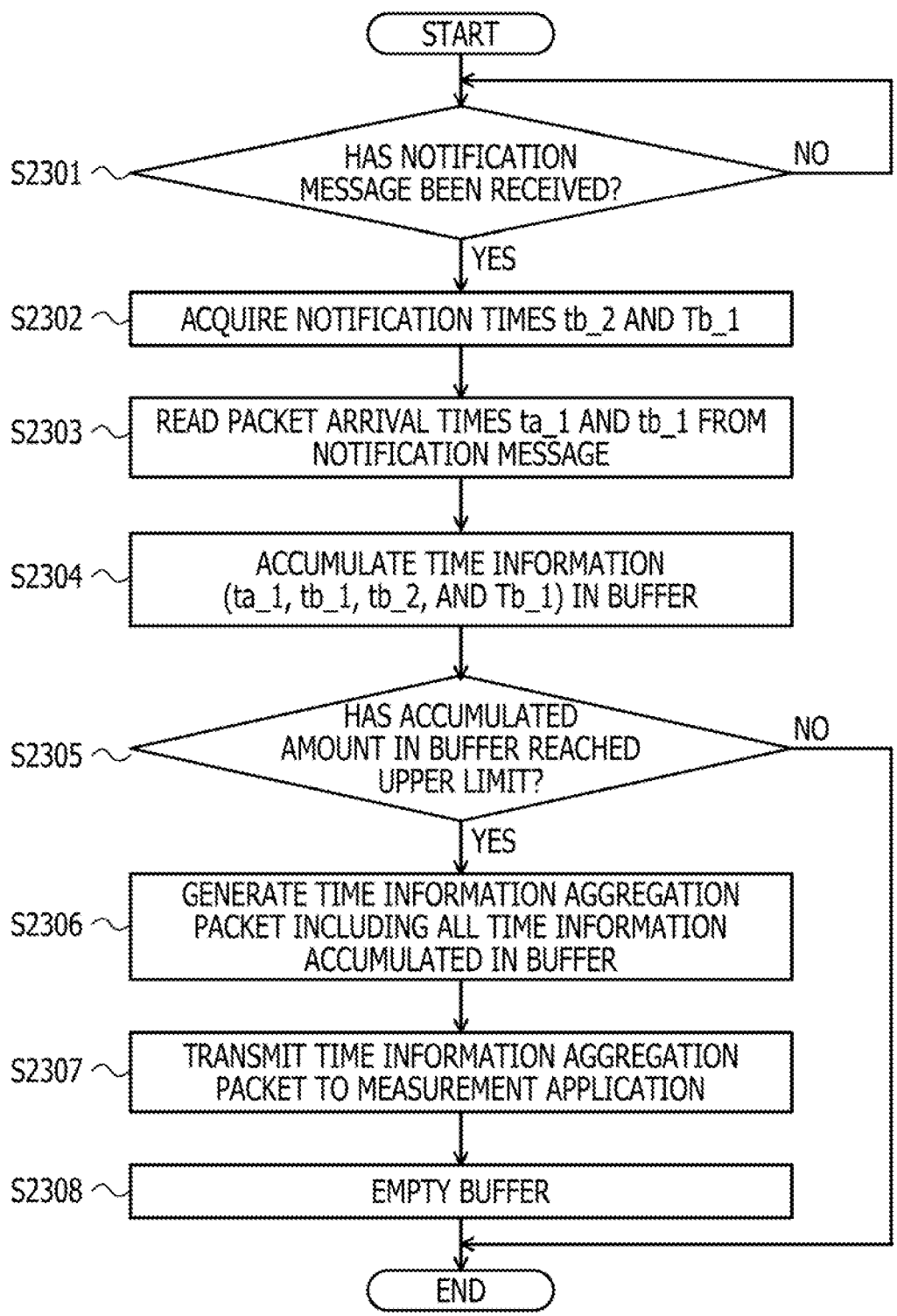
FIG. 23 is a flowchart illustrating an example of a time information relay processing procedure of a relay application RA$ according to the third embodiment.

FIG. 23 is a flowchart illustrating an example of a time information relay processing procedure of the relay application RA$ according to the third embodiment. In the flowchart of FIG. 23, first, the relay application RA$ determines whether or not the notification message m has been received (step S2301). Here, the relay application RA$ waits for reception of the notification message m (step S2301: No).

Then, in the case of receiving the notification message m (step S2301: Yes), the relay application RA$ acquires the notification time tb_2 and the notification time Tb_1 from the OS$ (step S2302). Next, the relay application RA$ reads the packet arrival time ta_1 and the packet arrival time tb_1 from the received notification message m (step S2303).

Note that, in the case where the notification message m includes an ID of the packet processing module pm #, the relay application RA$ may further read the ID from the notification message m.

The relay application RA$ accumulates the time information including the packet arrival time ta_1, the packet arrival time tb_1, the notification time tb_2, and the notification time Tb_1 in the buffer 2010 (step S2304). Next, the relay application RA$ determines whether or not an accumulated amount in the buffer 2010 has reached an upper limit (step S2305). For example, the relay application RA$ determines that the accumulated amount of the buffer 2010 has reached the upper limit when n pieces of time information is accumulated in the buffer 2010.

Here, in the case where the accumulated amount in the buffer 2010 has not reached the upper limit (step S2305: No), the relay application RA$ terminates the series of processing according to the present flowchart.

On the other hand, in the case where the accumulated amount in the buffer 2010 has reached the upper limit (step S2305: Yes), the relay application RA$ generates the time information aggregation packet including all the time information accumulated in the buffer 2010 (time information list) in the payload (step S2306).

Next, the relay application RA$ then transmits the generated time information aggregation packet to the measurement application MA # of the information processing device 101 #(step S2307). Then, the relay application RA$ empties the buffer 2010 (step S2308) and terminates the series of processing according to the present flowchart.

As a result, the relay application RA$ can store the time information (ta_1, tb_1, tb_2, and Tb_1) in the buffer 2010. Furthermore, when the accumulated amount in the buffer 2010 has reached the upper limit, all the time information in the buffer 2010 can be collectively transmitted from the relay application RA$ to the measurement application MA #.

Next, a communication time calculation processing procedure of the measurement application MA # of the information processing device 101 # will be described with reference to FIGS. 24 and 25.

Figure 24:
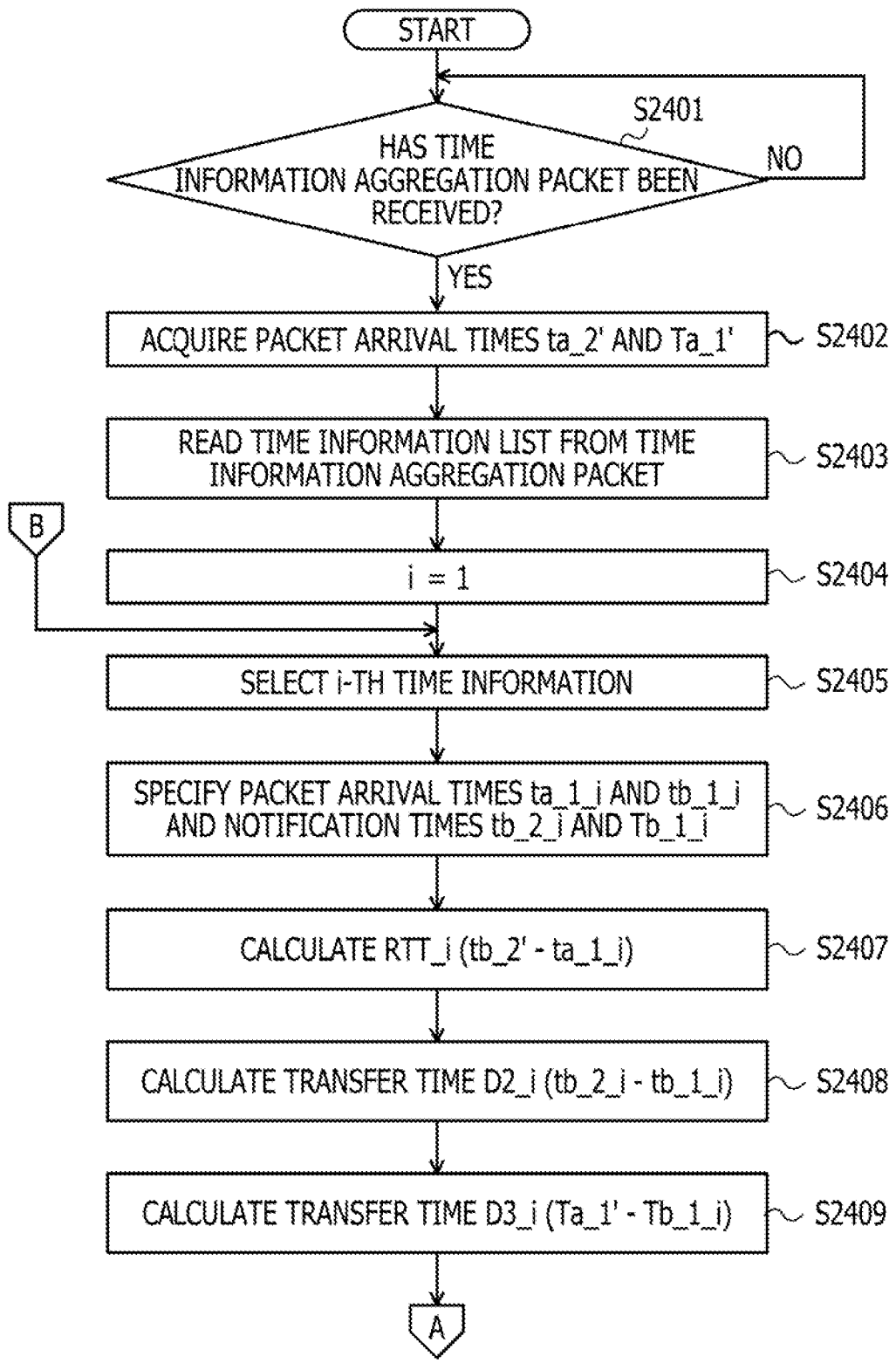
FIG. 24 is a flowchart (No. 1) illustrating an example of a communication time calculation processing procedure of a measurement application MA # according to the third embodiment.
Figure 25:
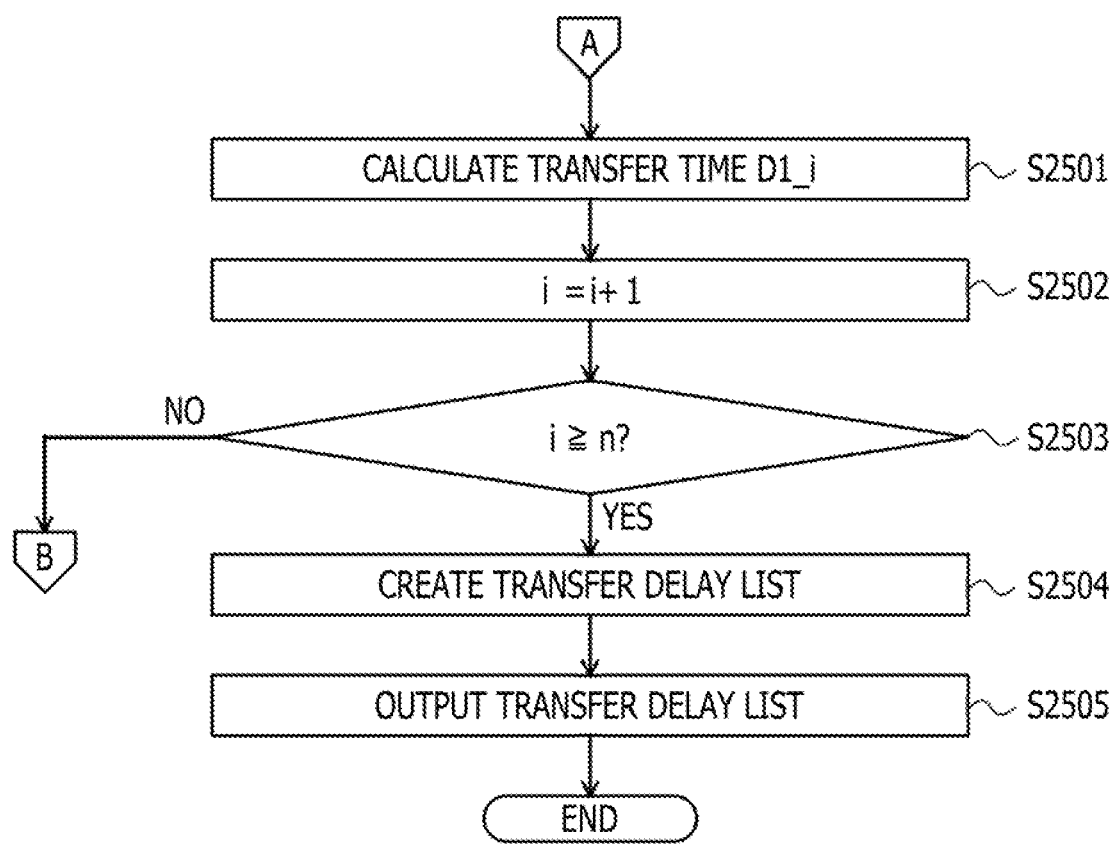
FIG. 25 is a flowchart (No. 2) illustrating an example of a communication time calculation processing procedure of a measurement application MA # according to the third embodiment.

FIGS. 24 and 25 are flowcharts illustrating an example of a communication time calculation processing procedure of the measurement application MA # according to the third embodiment. In the flowchart in FIG. 24, first, the measurement application MA # determines whether or not the time information aggregation packet has been received (step S2401). Here, the measurement application MA # waits for reception of the time information aggregation packet (step S2401: No).

Then, in the case of receiving the time information aggregation packet (step S2401: Yes), the measurement application MA # acquires the packet arrival time ta_2' and the packet arrival time Ta_1' from the OS #(step S2402). Next, the measurement application MA # reads the time information list from the payload of the received time information aggregation packet (step S2403).

Then, the measurement application MA # sets "i=1" (step S2404) and selects the i-th time information from the time information list (step S2405). Next, the measurement application MA # specifies the packet arrival time ta_1_i, the packet arrival time tb_1_i, the notification time tb_2_i, and the notification time Tb_1_i by referring to the selected time information (step S2406).

Next, the measurement application MA # calculates the RTT_i by subtracting the packet arrival time ta_1_i from the packet arrival time ta_2' (step S2407). Next, the measurement application MA # calculates the transfer time D2_i by subtracting the packet arrival time tb_1_i from the notification time tb_2_i (step S2408).

Next, the measurement application MA # calculates the transfer time D3_i by subtracting the notification time Tb_1_i from the packet arrival time Ta_1' (step S2409) and moves onto step S2501 illustrated in FIG. 25.

In the flowchart in FIG. 25, first, the measurement application MA # calculates the transfer time D1_i by subtracting the calculated transfer time D2_i and transfer time D3_i from the calculated RTT_i (step S2501). Next, the measurement application MA # Increments i (step S2502) and determines whether i has become n or more (step S2503).

Here, in the case where i is less than n (step S2503: No), the measurement application MA # returns to step S2405 illustrated in FIG. 24. On the other hand, in the case where i is n or more (step S2503: Yes), the measurement application MA # creates the transmission delay list including the calculated transfer times D1_1 to D1_n (step S2504).

Then, the measurement application MA # outputs the calculated transmission delay list (step S2505) and terminates the series of processing according to the present flowchart. Thereby, the transmission delay time corresponding to each time information in the time information included in the time information aggregation packet can be output.

Note that a packet processing procedure of the packet processing module pm # is similar to the packet processing procedure of the packet processing module pm # according to the first or second embodiment (see FIG. 12 or 18), and is thus not illustrated and described. Furthermore, a packet reading processing procedure of the packet reading module rm$ is similar to the packet reading processing procedure of the packet reading module rm$ according to the first or second embodiment (see FIG. 13 or 19) and is thus not illustrated and described.

As described above, according to the information processing system 100 of the third embodiment, the relay application RA$ can accumulate the time information of each of the plurality of packets P and collectively transmit the time information of the plurality of packets P to the measurement application MA #. Thereby, a communication data amount can be suppressed as compared with the case where the relay application RA$ transmits the time information packet TP for each packet P to the measurement application MA #.

Note that the communication time calculation method described in the present embodiment may be implemented by executing a prepared program on a computer such as a personal computer or a workstation. The present communication time calculation program is recorded on a computer-readable recording medium such as a hard disk, a flexible disk, a compact disk read only memory (CD-ROM), a digital versatile disc (DVD), or a USB memory, and is read from the recording medium and executed by the computer. Furthermore, the present communication time calculation program may be distributed via a network such as the Internet.

Furthermore, the information processing devices 101 # and 101$ described in the present embodiments may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of calculating a communication time between a first device and a second device, the method comprising:

by a first processor included in the first device having a first operation system, adding, to a first packet, first timer information indicating a timer value that is counted up in a clock cycle from a time of booting the first operation system of the first device at a time of transmission of the first packet to the second device having a second operation system, and transmitting the first packet;

by a second processor included in the second device, notification information including the first timer information included in the received first packet and second timer information indicating a timer value that is counted up in a clock cycle from a time of booting the second operation system of which a calendar time is synchronized with a calendar time of the first operation system at a time of reception of the first packet, transmitting the notification information to a relay application which is executed in a user space of the second operation system and reads the calendar time and a timer time, acquiring, in the relay application, third timer information indicating a timer value that is counted up in the clock cycle from the time of booting the second operation system at a time of reception of the first timer information and the second timer information at the relay application and first time information indicating the calendar time of the second operation system of the second device at a time of reception of the first timer information and the second timer information at the relay application and transmitting, by the relay application, a second packet including the first timer information, the second timer information, the third timer information and the first time information to a measurement application, which is executed in a user space of the first operation system, of the first device directly; and by the first processor included in the first device, calculating, at the measurement application, a communication time from the first device to the second device based on the first timer information, the second timer information, the third timer information, and the first time information included in the received second packet, fourth timer information indicating the calendar time of the first operation system of the first device at a time of reception of the second packet, and second time information indicating a time in the first device at the time of reception of the second packet.

2. The method according to claim 1, wherein the first device calculates a first time indicating a time difference between the first timer information and the fourth timer information, calculates a second time indicating a time difference between the second timer information and the third timer information, calculates a third time indicating a time difference between the first time information and the second time information, and calculates the communication time from the first device to the second device by subtracting the calculated second time and the calculated third time from the calculated first time.

3. The method according to claim 1, wherein the first timer information is written in an option header of the first packet.

4. The method according to claim 3, wherein the first timer information is represented by a lower 31-bit bit string of a 64-bit bit string indicating an elapsed time in nanosecond units.

5. The method according to claim 1, wherein the first timer information is written in an option header of a packet obtained by encapsulating the first packet.

6. The method according to claim 1, wherein the second processor of the second device accumulates, in a memory, combination data including the first timer information and the second timer information included in the notification information, the third timer information indicating an elapsed time from activation of the second device at the time of reception of the notification information, and the first time information indicating a time in the second device at the time of reception of the notification information, each time receiving the notification information, and transmits, as the second packet, a third packet including a predetermined number of the combination data to the first device, and the first processor of the first device calculates, for each combination data included in the third packet, when receiving the third packet, the communication time from the first device to the second device based on the combination data, fifth timer information indicating an elapsed time from activation of the first device at a time of reception of the third packet, and third time information indicating a time in the first device at the time of reception of the third packet.

7. The method according to claim 1, wherein the first device outputs the calculated communication time.

8. The method according to claim 1, wherein the first packet is a packet transmitted from an application that operates on a first container executed on a first OS of the first device to an application that operates on a second container executed on a second OS of the second device.

9. The method according to claim 8, wherein the first timer information is added to the first packet by a kernel of the first OS, the communication module being provided corresponding to a virtual NIC for connection between the first container and the first OS.

10. A non-transitory computer-readable recording medium having stored therein a program for calculating a communication time between a first device having a first operation system and a second device having a second operation system, the program for causing the first device to execute processing comprising:

adding, to a first packet, first timer information indicating a timer value that is counted up in a clock cycle from a time of booting the first operation system of the first device at a time of transmission of the first packet to the second device;

transmitting the first packet;

generating notification information including the first timer information included in the received first packet and second timer information indicating a timer value that is counted up in a clock cycle from a time of booting the second operation system of which a calendar time is synchronized with a calendar time of the first operation system at a time of reception of the first packet;

transmitting the notification information to a relay application which is executed in a user space of the second operation system and reads the calendar time and a timer time, acquiring, in the relay application, third timer information indicating a timer value that is counted up in the clock cycle from the time of booting the second operation system at a time of reception of the first timer information and the second timer information at the relay application and first time information indicating the calendar time of the second operation system of the second device at a time of reception of the first timer information and the second timer information at the relay application;

transmitting, by the relay application, a second packet including the first timer information, the second timer information, the third timer information and the first time information to a measurement application, which is executed in a user space of the first operation system, of the first device directly; and calculating, at the measurement application, a communication time from the first device to the second device based on the first timer information, the second timer information, the third timer information, and the first time information included in the received second packet, fourth timer information indicating the calendar time of the first operation system of the first device at a time of reception of the second packet, and second time information indicating a time in the first device at the time of reception of the second packet.

* * * * *